(12) United States Patent
Wakui

(10) Patent No.: US 10,880,453 B2
(45) Date of Patent: Dec. 29, 2020

(54) IMAGE PROCESSING DEVICE AND METHOD, PROGRAM, RECORDING MEDIUM, AND INKJET PRINTING SYSTEM

(71) Applicant: FUJIFILM Corporation, Tokyo (JP)

(72) Inventor: Takashi Wakui, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 266 days.

(21) Appl. No.: 15/194,393

(22) Filed: Jun. 27, 2016

(65) Prior Publication Data

US 2016/0309056 A1    Oct. 20, 2016

Related U.S. Application Data

(63) Continuation of application No. PCT/JP2015/052554, filed on Jan. 29, 2015.

(30) Foreign Application Priority Data

Jan. 30, 2014 (JP) ................................. 2014-015749

(51) Int. Cl.
*B41J 2/21* (2006.01)
*H04N 1/405* (2006.01)
*H04N 1/60* (2006.01)

(52) U.S. Cl.
CPC ............ *H04N 1/405* (2013.01); *B41J 2/2139* (2013.01); *B41J 2/2146* (2013.01); *H04N 1/605* (2013.01); *B41J 2/2142* (2013.01)

(58) Field of Classification Search
None
See application file for complete search history.

(56) References Cited

U.S. PATENT DOCUMENTS

| 5,070,413 | A | * | 12/1991 | Sullivan | ................... H04N 1/52 358/3.03 |
| 7,903,290 | B2 | * | 3/2011 | Faken | .................... B41J 2/2139 347/20 |
| 9,218,645 | B2 | | 12/2015 | Shibata | |
| 2006/0170973 | A1 | | 8/2006 | Takahashi | |
| 2006/0214971 | A1 | | 9/2006 | Yamazaki | |
| 2006/0262329 | A1 | | 11/2006 | Fujimori | |

(Continued)

FOREIGN PATENT DOCUMENTS

| JP | 2002-086767 A | 3/2002 |
| JP | 2004-050430 A | 2/2004 |

(Continued)

OTHER PUBLICATIONS

International Search Report (ISR) (PCT Form PCT/ISA/210), in PCT/JP2015/052554, dated Apr. 21, 2015.

(Continued)

*Primary Examiner* — Alejandro Valencia
(74) *Attorney, Agent, or Firm* — McGinn I.P. Law Group, PLLC.

(57) ABSTRACT

An image processing device (100) includes a non-discharge correction processing unit (114) that performs an image correction process for correcting an image defect caused by a non-discharge nozzle in an inkjet head and includes, as different files, a first halftone processing program file (152) that performs first halftone processing for a normal portion, which is an image region other than a non-discharge correction portion to be subjected to non-discharge correction and a non-discharge portion, and a second halftone processing program file (154) that performs second halftone processing for the non-discharge correction portion. The image processing device executes the first halftone processing program file (152) for the normal portion in an input image (102) and executes the second halftone processing program file (154) for the non-discharge correction portion, thereby obtaining a non-discharge-corrected halftone image (104).

19 Claims, 25 Drawing Sheets

(56) References Cited

U.S. PATENT DOCUMENTS

| | | | | |
|---|---|---|---|---|
| 2011/0090276 A1* | 4/2011 | Hirano | ................... | B41J 2/2132 |
| | | | | 347/14 |
| 2012/0075372 A1* | 3/2012 | Yamamoto | ............... | B41J 2/155 |
| | | | | 347/14 |
| 2013/0194593 A1 | 8/2013 | Yanai | | |
| 2013/0293611 A1 | 11/2013 | Ueshima | | |
| 2015/0035889 A1* | 2/2015 | Nakano | ................ | H04N 1/4057 |
| | | | | 347/15 |
| 2015/0043836 A1 | 2/2015 | Shibata | | |

FOREIGN PATENT DOCUMENTS

| | | |
|---|---|---|
| JP | 2006-240297 A | 9/2006 |
| JP | 2006-297919 A | 11/2006 |
| JP | 2013-157756 A | 8/2013 |
| JP | 2013-224000 A | 10/2013 |
| JP | 2013-233682 A | 11/2013 |

OTHER PUBLICATIONS

The Written Opinion of the ISA/JPO (PCT/ISA/237) in PCT/JP2015/052554, dated Apr. 21, 2015 and English translation thereof.

Extended European Search Report dated Feb. 22, 2017 in European Patent Application No. 15743483.8.

European Patent Office Communication pursuant to Article 94(c) EPC dated Jan. 5, 2018, in corresponding European Patent Application No. 15743483.8.

* cited by examiner

INPUT IMAGE
(CONTINUOUS TONE)

NON-DISCHARGE
-CORRECTED IMAGE
(CONTINUOUS TONE)

NON-DISCHARGE
-CORRECTED
HALFTONE IMAGE
(MULTIPLE VALUES)

INPUT IMAGE
(CONTINUOUS TONE)

HALFTONE IMAGE
(MULTIPLE VALUES)

NON-DISCHARGE
-CORRECTED
HALFTONE IMAGE
(MULTIPLE VALUES)

INPUT IMAGE
(CONTINUOUS TONE)

HALFTONE IMAGE
(MULTIPLE VALUES)

NON-DISCHARGE
-CORRECTED DROPLET
DISCHARGE SIGNAL

IMAGE PROCESSING DEVICE AND METHOD, PROGRAM, RECORDING MEDIUM, AND INKJET PRINTING SYSTEM

CROSS-REFERENCE TO RELATED APPLICATIONS

The present application is a Continuation of PCT International Application No. PCT/JP2015/052554 filed on Jan. 29, 2015 claiming priority under 35 U.S.C § 119(a) to Japanese Patent Application No. 2014-015749 filed on Jan. 30, 2014. Each of the above applications is hereby expressly incorporated by reference, in their entirety, into the present application.

BACKGROUND OF THE INVENTION

1. Field of the Invention

The present invention relates to an image processing technique for inkjet printing, and more particularly, to an image processing device and method, a program, a recording medium, and an inkjet printing system in which a non-discharge correction process serving as an image correction function that corrects a recording fault caused by a non-discharge nozzle is combined with halftone processing that converts continuous-tone image data into halftone image data which is dot data.

2. Description of the Related Art

An inkjet printing system controls an ink discharge operation of each nozzle in an inkjet head, on the basis of image data to be printed, and forms an image on a recording medium. In some cases, in the inkjet head, a non-discharge nozzle which is not capable of discharging ink is generated due to, for example, nozzle clogging or a failure in a discharge energy generation element. Furthermore, in some cases, a defective nozzle that can discharge ink, but has a landing position error greater than an allowable value, which causes a large amount of discharge bending, is forced not to discharge ink such that it is not used for recording, and is treated as a non-discharge nozzle.

A non-discharge nozzle is not capable of recording a dot. In particular, in a single-pass inkjet printing system, a white streak-shaped image defect occurs at an image position corresponding to the non-discharge nozzle in a printed image along a sheet transport direction, which causes deterioration of printing quality. A "non-discharge correction" technique is known as a correction technique for preventing an image defect caused by a non-discharge nozzle (JP2004-50430A, JP2002-86767A, JP2006-240297A, and JP2006-297919A). The term "non-discharge correction" is synonymous with "non-ejection correction". In the specification, the term "non-discharge correction" is used.

SUMMARY OF THE INVENTION

Non-discharge correction is achieved by changing dots which are discharged from other discharge nozzles adjacent to a non-discharge nozzle. Non-discharge correction methods can be mainly classified into three methods.

[1] A first method corrects a continuous-tone image before halftone processing. That is, the first method corrects a signal value of a pixel in the vicinity of a non-discharge portion such that it is greater than a signal value before correction in a continuous-tone image, which is an image to be input to halftone processing, thereby increasing the amount of ink discharged from nozzles in the vicinity of the non-discharge portion in the halftone processing. The first method will be described in detail below (see FIG. 1 and FIGS. 2A to 2C).

The term "non-discharge portion" indicates an image position where recording is not possible due to the non-discharge nozzle. The "non-discharge correction portion" means an image region which is adjacent to the non-discharge portion, is in the vicinity of the non-discharge portion, and is subjected to a correction process. The non-discharge portion and the non-discharge correction portion are referred to as a "correction portion" and a non-correction portion which is an image region other than the correction portion is referred to as a "normal portion".

[2] The second method corrects a halftone image. That is, the second method performs halftone processing for an input image which is a continuous-tone image, without discriminating between a non-discharge correction portion and a normal portion, and converts dot data in the non-discharge correction portion of the obtained halftone image (that is, changes the arrangement of dots). The second method will be described in detail below (see FIG. 3 and FIGS. 4A to 4C).

[3] The third method does not perform a special image correction process in the generation of a halftone image, changes a discharge driving waveform of a nozzle in the vicinity of the non-discharge portion to increase the size of the dot to be discharged, and fills a white streak part of the non-discharge portion with dots. The third method will be described in detail below (see FIG. 5 and FIGS. 6A to 6C).

The non-discharge correction technique can output a high-quality printed image even in a case in which there is a non-discharge nozzle in a nozzle row of the inkjet head and is an important function of an inkjet printing machine requiring high productivity or stable printing quality. In recent years, there has been an increasing demand for incorporating a non-discharge correction function into an inkjet printing system.

In order to meet this demand, a service of selling a non-discharge-corrected image processing module that is a module with a non-discharge-corrected image processing function which can be incorporated into an inkjet printing system has been provided. Therefore, for example, a printing machine manufacturer can purchase a commercially available non-discharge-corrected image processing module and mount the non-discharge-corrected image processing module on its own inkjet printing machine to construct an inkjet printing system with a non-discharge correction function.

Most of the commercially available non-discharge-corrected image processing modules use the first method and a non-discharge-corrected image processing module package has a halftone processing function. That is, the non-discharge-corrected image processing module according to the related art is a halftone processing module with a non-discharge correction function.

In some cases, printing machine manufacturers develop and possess their own halftone image processing techniques. The quality or finished impression of a printed image, which is a printout, varies depending on the type of halftone processing applied to generate a halftone image for printing. As a simple example, even if the same input image is printed out, there is a difference in quality or finished impression between an image obtained by amplitude modulation (AM) screening and an image obtained by frequency modulation (FM) screening. Therefore, in general, printing machine manufacturers having their own halftone image processing techniques want to incorporate their own halftone processing functions into printing machines.

However, as described above, in the non-discharge-corrected image processing module according to the related art, a non-discharge correction process and halftone processing are integrally provided, that is, incorporated into one process. Therefore, it is difficult to use the non-discharge correction and halftone processing provided by the non-discharge-corrected image processing module and the halftone processing of the printing machine manufacturer in combination with each other. The halftone processing of the non-discharge-corrected image processing module needs to be used in order to implement the non-discharge correction function.

The inventors paid attention to a new problem that there was no proper means to meet a demand for incorporating a non-discharge correction function into an inkjet printing system and a demand for using halftone processing unique to each manufacturer.

The invention has been made in view of the above-mentioned problems and an object of the invention is to provide an image processing device and method, a program, a recording medium, and an inkjet printing system which can treat halftone processing for a non-discharge correction portion and halftone processing for a normal portion as different types of processing.

As another problem, in a case in which different types of halftone processing are performed for the non-discharge correction portion and the normal portion, when there is a significant difference between the arrangement characteristics of dots in the non-discharge correction portion and the arrangement characteristics of dots in the normal portion, poor connection between image regions occurs and the non-discharge correction portion is likely to be conspicuous. The invention also handles means for solving an artifact problem.

In order to achieve the object, the following aspects are provided.

An image processing device according to a first aspect comprises: a non-discharge correction processing unit that performs an image correction process for correcting an image defect caused by a non-discharge nozzle in an inkjet head including a plurality of nozzles; at least one first halftone processing program file that performs first halftone processing for a normal portion, which is an image region other than a non-discharge correction portion to be subjected to the image correction process by the non-discharge correction processing unit and a non-discharge portion in which recording is not possible due to the non-discharge nozzle, to generate a first halftone image; and at least one second halftone processing program file that is different from the first halftone processing program file and performs second halftone processing, which is different from the first halftone processing, for the non-discharge correction portion to generate a second halftone image. The first halftone processing program file is executed for the normal portion of an input image and the second halftone processing program file is executed for the non-discharge correction portion of the input image.

According to the image processing device of the first aspect, the halftone processing for the non-discharge correction portion and the halftone processing for the normal portion can be treated as different types of processing. Therefore, for example, it is possible to use the existing halftone processing of each manufacturer and an image processing module for non-discharge correction which is supplied from other manufacturers in combination with each other.

According to this aspect, the existing halftone processing program file of each manufacturer can be used without any change. Therefore, it is possible to provide an image processing module for non-discharge correction at a low cost.

As a second aspect, the image processing device according to the first aspect may further comprise: a non-discharge portion information storage unit that stores non-discharge portion information corresponding to a position of the non-discharge nozzle; an image region discrimination unit that discriminates between the normal portion and the non-discharge correction portion in the input image, on the basis of the non-discharge portion information; and a halftone processing switching unit that executes the first halftone processing program file and the second halftone processing program file for the normal portion and the non-discharge correction portion, respectively, on the basis of a determination result of the image region discrimination unit, to switch halftone processing to be applied to the normal portion and the non-discharge correction portion.

As a third aspect, the image processing device according to the first aspect may further comprise: a non-discharge portion information storage unit that stores non-discharge portion information corresponding to a position of the non-discharge nozzle; an image division processing unit that divides the input image into the normal portion and the non-discharge correction portion on the basis of the non-discharge portion information; and an integration processing unit that integrates the first halftone image obtained by the execution of the first halftone processing program file for the normal portion divided by the image division processing unit with the second halftone image obtained by the execution of the second halftone processing program file for the non-discharge correction portion divided by the image division processing unit.

As a fourth aspect, in the image processing device according to any one of the first to third aspects, an algorithm of the first halftone processing by the first halftone processing program file may be different from an algorithm of the second halftone processing by the second halftone processing program file.

As a fifth aspect, in the image processing device according to the fourth aspect, the second halftone processing may be performed by the second halftone processing program file using a dither mask.

According to the above-mentioned aspect, it is possible to definitely determine a dot pattern of the non-discharge correction portion on the basis of the dither mask. Therefore, good non-discharge correction is stably achieved.

As a sixth aspect, in the image processing device according to any one of the first to fifth aspects, the first halftone processing for the normal portion and the second halftone processing for the non-discharge correction portion may be performed at different times, the frequency of the second halftone processing for the non-discharge correction portion may be higher than the frequency of the first halftone processing for the normal portion, or the number of times the second halftone processing is performed for the non-discharge correction portion may be larger than the number of times the first halftone processing is performed for the normal portion.

According to the above-mentioned aspect, it is possible to obtain a non-discharge-corrected halftone image just by partially performing halftone processing for the non-discharge correction portion. Therefore, the operation time required for halftone processing can be less than that a case in which halftone processing is performed for the entire image.

As a seventh aspect, the image processing device according to the sixth aspect may further include a first halftone image storage unit that stores the first halftone image obtained by the execution of the first halftone processing for the normal portion. A process which integrates the second halftone image of the non-discharge correction portion that is sequentially created by performing the second halftone processing for the non-discharge correction portion according to a state of the non-discharge nozzle in the inkjet head with the first halftone image that is stored in the first halftone image storage unit in advance may be performed.

As an eighth aspect, in the image processing device according to any one of the first to seventh aspects, data created by the first halftone processing may be given as an input to the second halftone processing.

According to the above-mentioned aspect, it is possible to prevent an artifact in a connection portion due to a difference between the dot patterns of the non-discharge correction portion and the normal portion.

As a ninth aspect, in the image processing device according to the eighth aspect, data of the first halftone image of the normal portion created by the first halftone processing may be given as an input to the second halftone processing. The image processing device may further include an arithmetic processing unit that applies a blur function to the first halftone image which is given as the input to the second halftone processing. The second halftone processing may be performed for data obtained by applying the blur function to the first halftone image.

As a tenth aspect, in the image processing device according to the ninth aspect, the blur function may be a Dooley's visual transfer function.

As an eleventh aspect, in the image processing device according to the eighth aspect, the data which is created by the first halftone processing and is given as the input to the second halftone processing may be a cumulative error which is generated by an error diffusion process in the first halftone processing and the second halftone processing program file may perform the error diffusion process in the non-discharge correction portion, using the accumulative error as initial error data.

As a twelfth aspect, in the image processing device according to any one of the eighth to eleventh aspects, the second halftone processing program file may perform the second halftone processing for the non-discharge correction portion, using the input image, in addition to the data created by the first halftone processing.

As a thirteenth aspect, in the image processing device according to the twelfth aspect, in the second halftone processing, a process that arranges no dots may be performed in a case in which a signal value of a pixel to be processed which corresponds to the non-discharge correction portion of the input image is equal to a specific value or a process that certainly arranges dots may be performed in a case in which the signal value of the pixel to be processed is equal to or less than the specific value.

As a fourteenth aspect, in the image processing device according to any one of the first to thirteenth aspects, a plurality of the second halftone processing program files that can be applied to the second halftone processing for the non-discharge correction portion may be provided.

As a fifteenth aspect, the image processing device according to the fourteenth aspect may further comprise a user interface that enables a user to select a second halftone processing program file used for the second halftone processing from the plurality of second halftone processing program files.

As a sixteenth aspect, in the image processing device according to any one of the first to fifteenth aspects, the inkjet head may be a line head used in an inkjet printing system that records an image using a single-pass method and the non-discharge correction portion may be an image region including pixel rows which are adjacent to both sides of a pixel row of the non-discharge portion.

An image processing method according to a seventeenth aspect comprises: a non-discharge correction processing step of performing an image correction process for correcting an image defect caused by a non-discharge nozzle in an inkjet head including a plurality of nozzles; a first halftone processing step of executing a first halftone processing program file to perform first halftone processing for a normal portion, which is an image region other than a non-discharge correction portion to be subjected to the image correction process in the non-discharge correction processing step and a non-discharge portion in which recording is not possible due to the non-discharge nozzle in an input image, thereby generating a first halftone image; and a second halftone processing step of executing a second halftone processing program file that is different from the first halftone processing program file to perform second halftone processing, which is different from the first halftone processing, for the non-discharge correction portion in the input image, thereby generating a second halftone image.

A program according to an eighteenth aspect causes a computer to implement: a non-discharge correction processing function of performing an image correction process for correcting an image defect caused by a non-discharge nozzle in an inkjet head including a plurality of nozzles; a first halftone processing function of executing a first halftone processing program file to perform first halftone processing for a normal portion, which is an image region other than a non-discharge correction portion to be subjected to the image correction process by the non-discharge correction processing function and a non-discharge portion in which recording is not possible due to the non-discharge nozzle in an input image, thereby generating a first halftone image; and a second halftone processing function of executing a second halftone processing program file that is different from the first halftone processing program file to perform second halftone processing, which is different from the first halftone processing, for the non-discharge correction portion in the input image, thereby generating a second halftone image.

An inkjet printing system according to a nineteenth aspect comprises the image processing device according to any one of the first to sixteenth aspects and the inkjet head. The inkjet head records an image on the basis of data of a halftone image generated by the image processing device.

According to the invention, it is possible to treat the halftone processing for the non-discharge correction portion and the halftone processing for the normal portion as different types of processing. Therefore, it is possible to use the existing halftone processing and the halftone processing for the non-discharge correction in combination with each other.

BRIEF DESCRIPTION OF THE DRAWINGS

FIG. 14A is a diagram illustrating the dot pattern of the normal portion, FIG. 14B is a diagram illustrating the dot pattern of the non-discharge correction portion, FIG. 14C is a diagram illustrating a dot pattern of a non-discharge-corrected half-tone image, and FIG. 14D is a diagram illustrating the visual appearance of a printing result.

FIG. 15A is a diagram illustrating the dot pattern of the normal portion, FIG. 15B is a diagram illustrating the dot pattern of the non-discharge correction portion, FIG. 15C is a diagram illustrating a dot pattern of a non-discharge-corrected half-tone image, and FIG. 15D is a diagram illustrating the visual appearance of a printing result.

DESCRIPTION OF THE PREFERRED EMBODIMENTS

Hereinafter, embodiments of the invention will be described in detail with reference to the accompanying drawings.

<For Outline of Non-Discharge Correction Technique>

First, the outline of a non-discharge correction technique in an inkjet printing system that records images using a single-pass method will be described. The non-discharge correction technique is a correction technique that changes a dot pattern of an image position corresponding to nozzles in the vicinity of a non-discharge nozzle in an inkjet head to complement a recording defect portion (that is, a streak-shaped image defect) caused by the non-discharge nozzle with the recording of dots by ink discharge from nozzles other than the non-discharge nozzle and reduces the visibility of the image defect.

Figure 1:
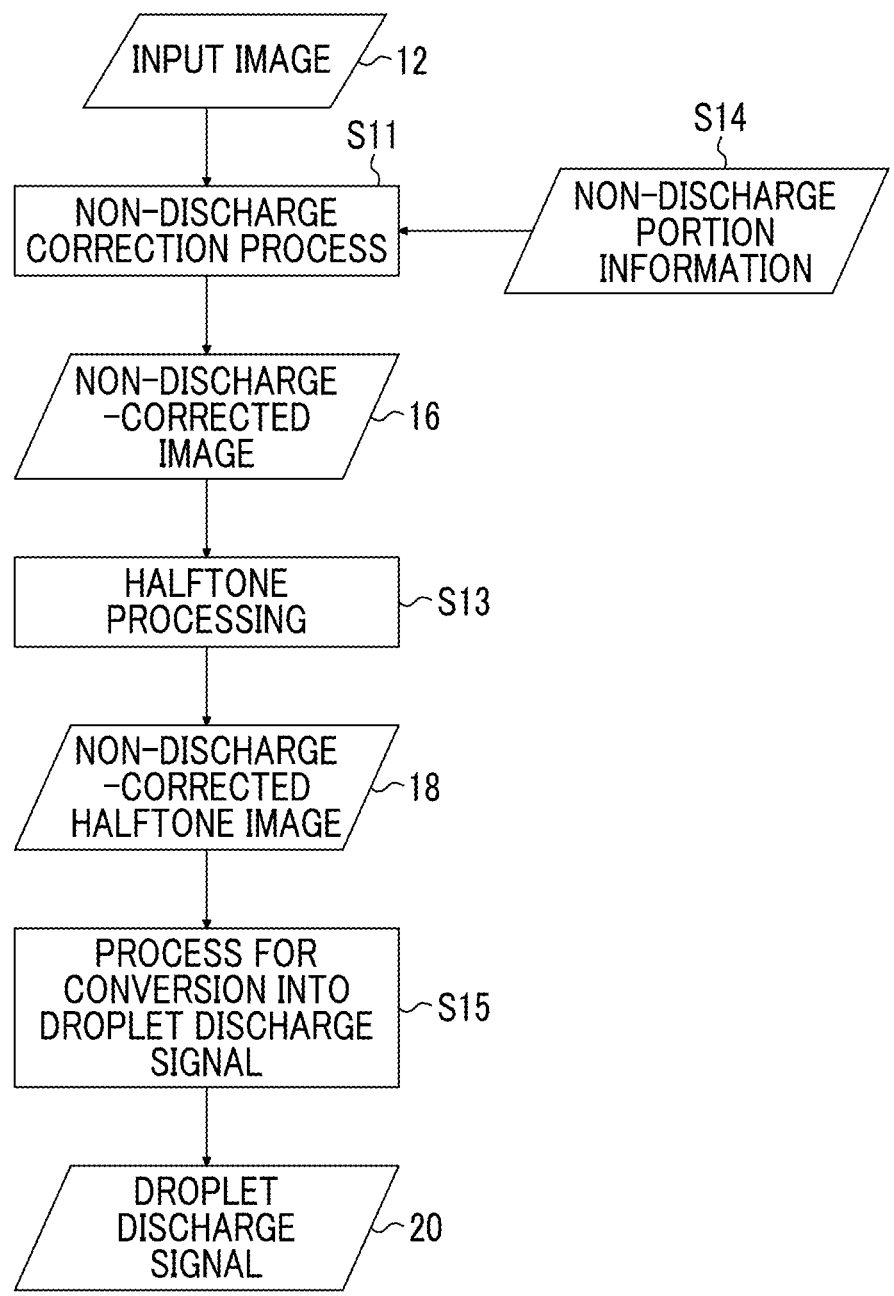
FIG. 1 is a flowchart illustrating an example of non-discharge correction which is classified as a first method.
Figure 2A:
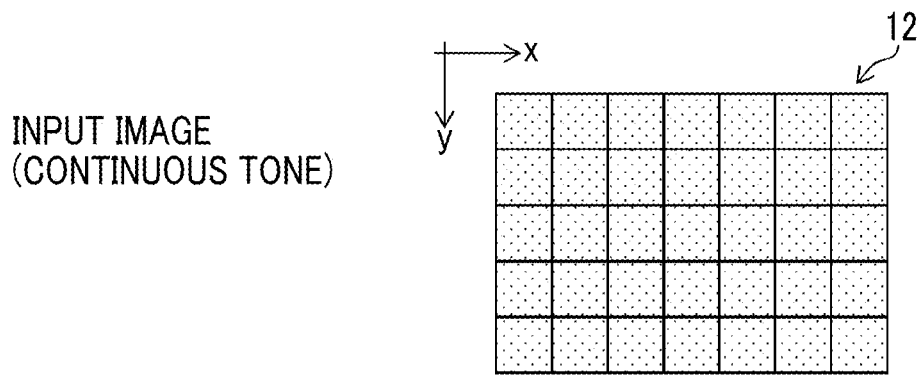
FIG. 2A is a diagram schematically illustrating image data which is treated in the non-discharge correction process classified as the first method and is a diagram schematically illustrating an input image.
Figure 2B:
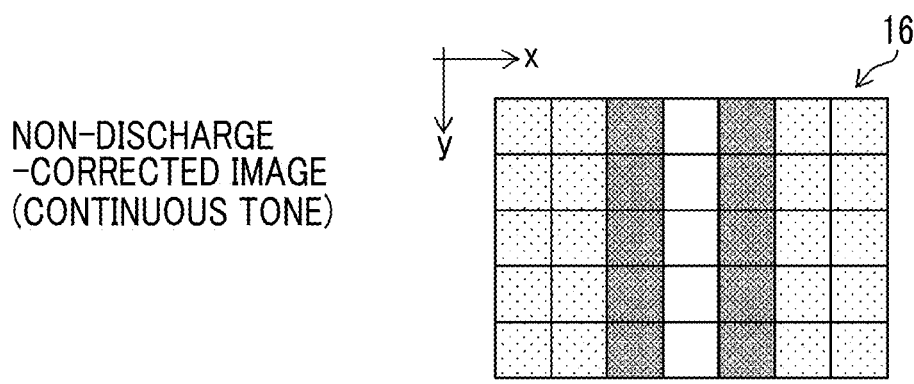
FIG. 2B is a diagram schematically illustrating image data which is treated in the non-discharge correction process classified as the first method and is a diagram schematically illustrating a non-discharge-corrected image.
Figure 2C:
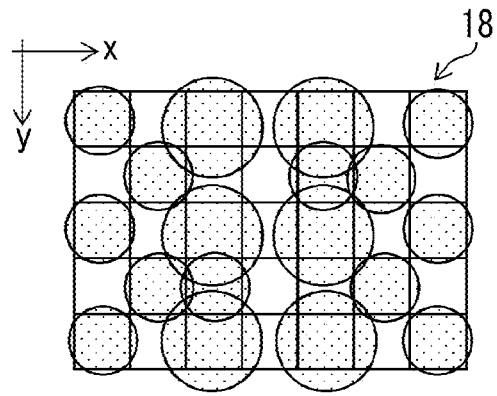
FIG. 2C is a diagram schematically illustrating image data which is treated in the non-discharge correction process classified as the first method and is a diagram schematically illustrating a non-discharge-corrected halftone image.

As described above, non-discharge correction methods are mainly classified into three methods, that is, the first to third methods. FIG. 1 is a flowchart illustrating an example of non-discharge correction which is classified as the first method. FIGS. 2A to 2C are diagrams schematically illustrating image data that is treated in the procedure of the non-discharge correction which is classified as the first method. FIG. 2A is a diagram schematically illustrating an input image. FIG. 2B is a diagram schematically illustrating a non-discharge-corrected image. FIG. 2C is a diagram schematically illustrating a non-discharge-corrected halftone image.

In FIGS. 2A to 2C, the vertical direction is a paper transport direction and the horizontal direction corresponds to a direction in which nozzles are arranged in a line-type inkjet head. A direction that is parallel to the paper transport direction is referred to as a sub-scanning direction and is a y direction. A direction which is perpendicular to the y direction and in which nozzles are arranged is referred to as a "main scanning direction" or a "paper width direction" and is an x direction. FIGS. 2A to 2C illustrate an image region which has a size of 7×5 pixels in the x direction and the y direction.

In the non-discharge correction method illustrated in FIG. 1, a non-discharge correction process (Step S11) is performed for an input continuous-tone image 12, using non-discharge portion information 14, to generate a non-discharge-corrected image 16.

The non-discharge portion information 14 is information indicating the position of the non-discharge nozzle in the inkjet head. The term "non-discharge portion information" can be substituted with "positional information of a non-discharge nozzle" or "non-discharge nozzle information". The positional information of the non-discharge nozzle which is unavailable for image recording can be specified from, for example, the output result of a test pattern. The specified positional information of the non-discharge nozzle is stored as the non-discharge portion information 14 in a non-discharge portion information storage unit such as a memory. The non-discharge portion information 14 may be nozzle number information, image position information corresponding to a nozzle number, or a combination thereof.

The input image 12 is original image data indicating the content of an image to be printed. The data format of the input image 12 is not particularly limited. However, here, for simplicity of explanation, the input image 12 is a continuous-tone image having the same color type, the same number of colors, and the same resolution as those used in the inkjet printing system.

In FIG. 2A, the input image 12 is an image with uniform density (uniform gradation), that is, a so-called solid image.

In the non-discharge correction process (Step S11) illustrated in FIG. 1, image data at an image position in the vicinity of the non-discharge nozzle is corrected and the non-discharge-corrected image 16 which is data of a corrected continuous-tone image is obtained.

In the non-discharge-corrected image 16 illustrated in FIG. 2B, a signal value (that is, a pixel value) indicating the gradation of a pixel is reflected in the shading of each pixel. In FIG. 2B, a pixel column corresponding to a non-discharge portion is represented by a white pixel column. Pixel columns which are adjacent to the left and right sides of the non-discharge portion are non-discharge correction portions and portions outside the non-discharge correction portions correspond to normal portions as non-correction portions. The pixel value of the non-discharge correction portion is changed to a value that is greater than the pixel value of the normal portion.

When non-discharge correction is performed, an optimal correction condition is that the amounts of ink before and after correction are substantially equal to each other. As a simple example, in a case in which one nozzle is not capable of discharging ink and two nozzles on both sides of the non-discharge nozzle are used to perform correction, two nozzles on both sides of the non-discharge nozzle discharge a predetermined amount of ink which is to be discharged from three nozzles including the non-discharge nozzle and two nozzles on both sides of the non-discharge nozzle in the related art. Therefore, when the amount of ink which is discharged from each of the correction nozzles on both sides of the non-discharge nozzle is about 1.5 times more than the amount of ink discharged in the normal portion, a difference in density between the normal portion and the correction portion is reduced and a non-discharge-corrected portion in a printed matter is inconspicuous. In addition, in practice, since nozzles have different discharge characteristics, the amount of ink discharged from the correction nozzles is not strictly 1.5 times more than that in the normal portion and a given tolerance is given to a correction value. That is, a non-discharge correction parameter which defines a correction value indicating the amount of correction for the amount of ink corresponding to the position of the correction nozzle is prepared. For example, a test chart is output in advance to check the discharge characteristics of the inkjet head and a non-discharge correction parameter which defines a correction value, such as a correction coefficient, for correcting a pixel value at each position of the non-discharge correction portion is created. The non-discharge correction parameter is used to correct the pixel value. In this way, the non-discharge-corrected image 16 is generated.

Halftone processing (Step S13 of FIG. 1) is performed for the obtained non-discharge-corrected image 16 to obtain a non-discharge-corrected halftone image 18 which is image data indicating a dot pattern (see FIG. 2C).

In general, the halftone processing (Step S13 of FIG. 1) is processing that quantizes M-valued (M is an integer equal to or greater than 3) multi-tone image data which is a continuous-tone image and converts the M-valued multi-tone image data into N-valued (N is an integer that is equal to or greater than 2 and is less than M) dot data which can be recorded by the inkjet head. For example, when the inkjet head can discharge three types of droplet sizes (dot sizes), that is, a small droplet, a medium droplet, and a large droplet, the continuous-tone non-discharge-corrected image 16 is converted into 4-gradation (N=4) signals, such as a signal indicating the "discharge of a large ink droplet", a signal indicating the "discharge of a medium ink droplet", a signal indicating the "discharge of a small ink droplet", and a signal indicating "no discharge (no droplet)" in the halftone processing (Step S13). For example, a dither method or an error diffusion method is applied to the halftone processing. A large droplet is discharged to form a large dot on a recording medium. A medium droplet is discharged to form a medium dot on a recording medium. A small droplet is discharged to form a small dot on a recording medium.

The non-discharge-corrected halftone image 18 generated through the halftone processing (Step S13) is dot data in which a gradation correction process, which is the non-discharge correction process (Step S11), is reflected. That is, in the first method, the non-discharge-corrected halftone image 18 is obtained by a process that performs non-discharge correction for the data of a continuous-tone image before halftone processing to generate the non-discharge-corrected image 16 in which a signal value (gradation value) corresponding to an image position in the vicinity of the non-discharge nozzle increases and performs halftone processing (Step S13) for the non-discharge-corrected image 16.

The halftone processing is designed such that a portion with a higher gradation has a larger number of dots and a larger number of dots appear in the portion. Therefore, as illustrated in FIG. 2C, a large number of dots are arranged in the non-discharge correction portion.

A conversion process (Step S15 of FIG. 1) which converts the obtained non-discharge-corrected halftone image 18 into a droplet discharge signal for controlling the discharge of droplets from the inkjet head is performed to generate a droplet discharge signal 20. An ink discharge operation of the inkjet head is controlled on the basis of the droplet discharge signal 20 to obtain an output image in which a white streak caused by the non-discharge nozzle has been corrected.

The first method can be understood as a non-discharge correction method which processes an input image.

Figure 3:
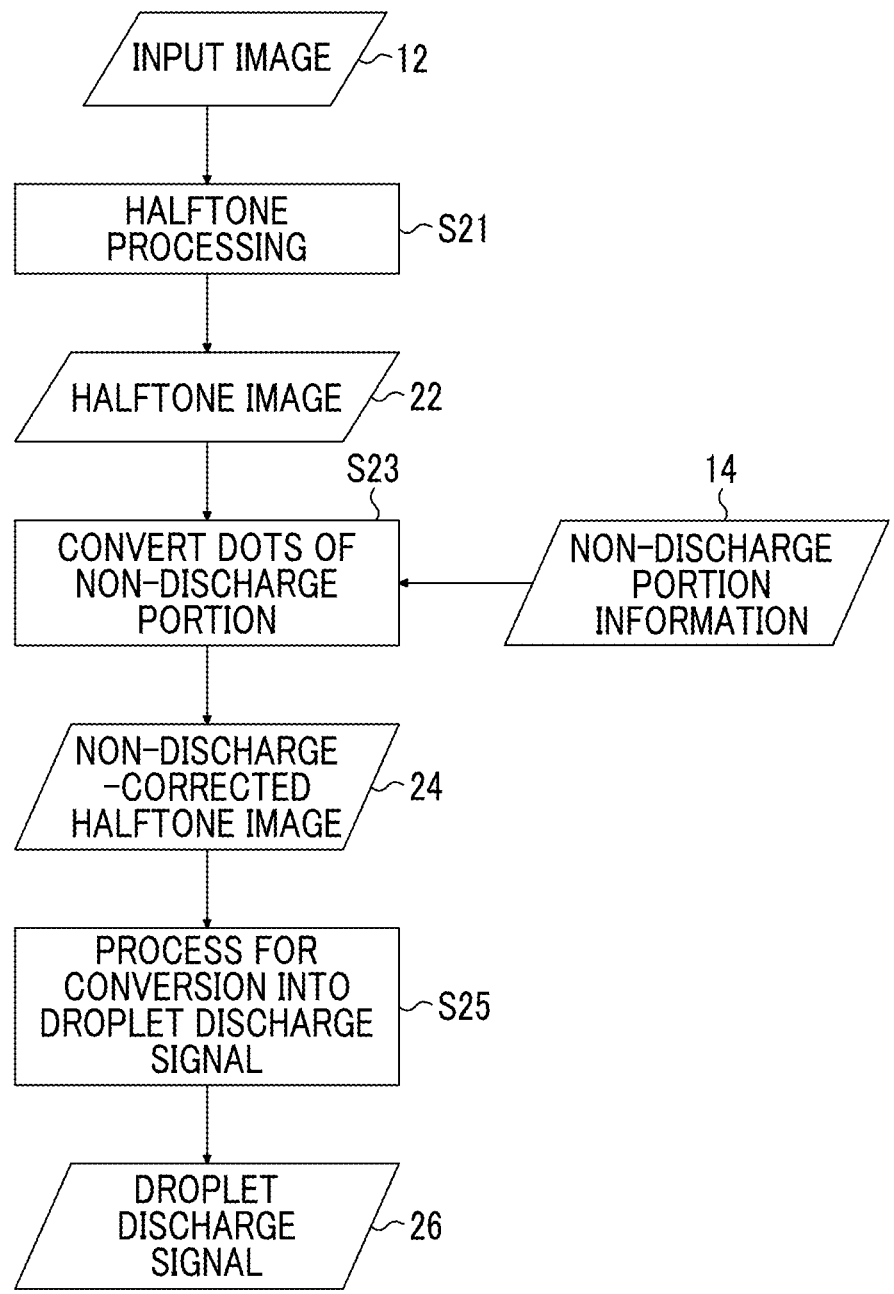
FIG. 3 is a flowchart illustrating an example of non-discharge correction which is classified as a second method.
Figure 4A:
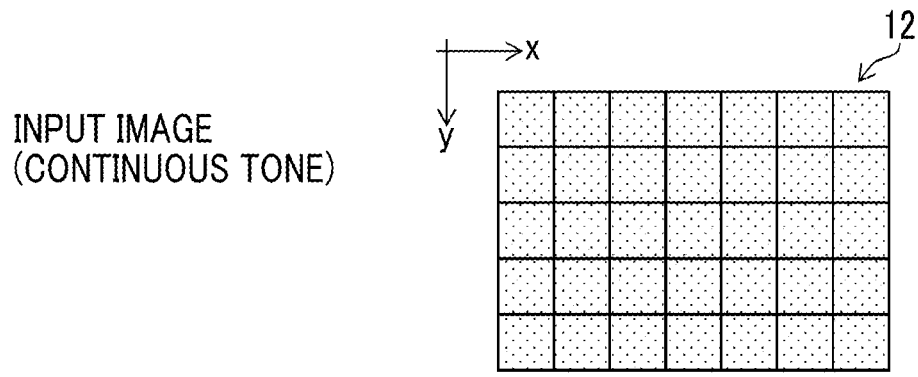
FIG. 4A is a diagram schematically illustrating image data which is treated in the non-discharge correction process classified as the second method and is a diagram schematically illustrating an input image.
Figure 4B:
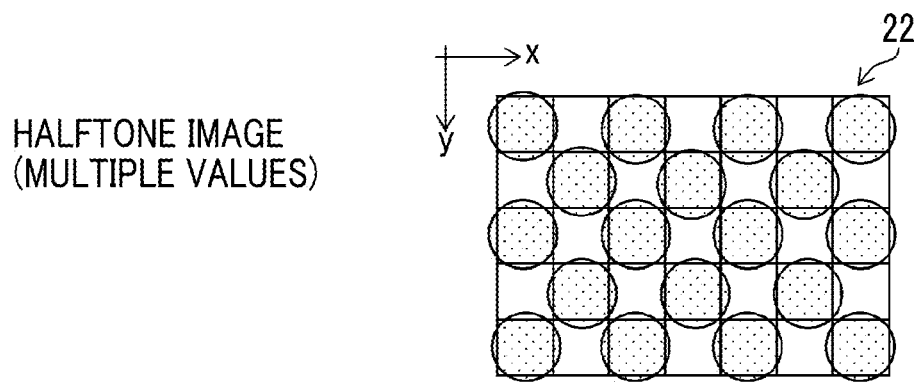
FIG. 4B is a diagram schematically illustrating image data which is treated in the non-discharge correction process classified as the second method and is a diagram schematically illustrating a halftone image before correction.
Figure 4C:
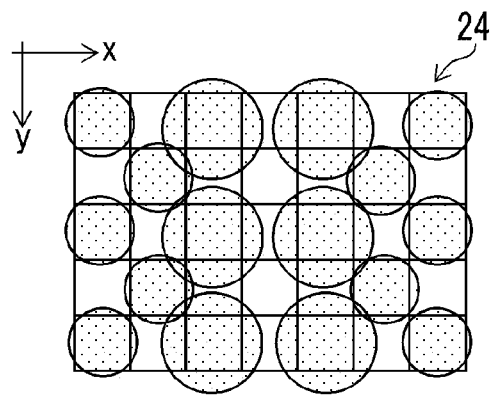
FIG. 4C is a diagram schematically illustrating image data which is treated in the non-discharge correction process classified as the second method and is a diagram schematically illustrating a non-discharge-corrected halftone image.

FIG. 3 is a flowchart illustrating an example of the non-discharge correction which is classified as the second method. FIGS. 4A to 4C are diagrams illustrating image data that is treated in the procedure of the non-discharge correction which is classified as the second method. FIG. 4A is a diagram schematically illustrating an input image. FIG. 4B is a diagram schematically illustrating a halftone image. FIG. 4C is a diagram schematically illustrating a non-discharge-corrected halftone image. In FIG. 3 and FIGS. 4A to 4C, the same or similar structures as those in FIG. 1 and FIGS. 2A to 2C are denoted by the same reference numerals and the description thereof will not be repeated.

In the non-discharge correction method by the second method, illustrated in FIG. 3, halftone processing (Step S21) is performed for an input continuous-tone image 12 to obtain a halftone image 22 and a conversion process which corrects the arrangement of dots in an image region corresponding to a non-discharge correction portion is performed for the halftone image 22 (Step S23). In a "process of converting dots in a non-discharge correction portion" of Step S23, image regions corresponding to the non-discharge portion and the non-discharge correction portion are discriminated, using the non-discharge portion information 14, and the dots of the non-discharge correction portion in the halftone image 22 are changed.

A non-discharge-corrected halftone image 24 is generated by the process of converting dots in the non-discharge correction portion (Step S23).

FIG. 4B illustrates the halftone image 22 generated in Step S21 of FIG. 3 and FIG. 4C illustrates the non-discharge-corrected halftone image 24 generated in Step S23 of FIG. 3.

A conversion process (Step S25 of FIG. 3) which converts the obtained non-discharge-corrected halftone image 24 (Step S23) into a droplet discharge signal for controlling the discharge of droplets from the inkjet head is performed to generate a droplet discharge signal 26. An ink discharge operation of the inkjet head is controlled on the basis of the droplet discharge signal 26 to obtain an output image in which a white streak caused by the non-discharge nozzle has been corrected.

The second method can be understood as a non-discharge correction method which processes a halftone image. When the process of converting dots in a non-discharge correction portion (Step S23) is regarded as halftone processing in a broad sense, the second method can be understood as 2-stage halftone processing.

Figure 5:
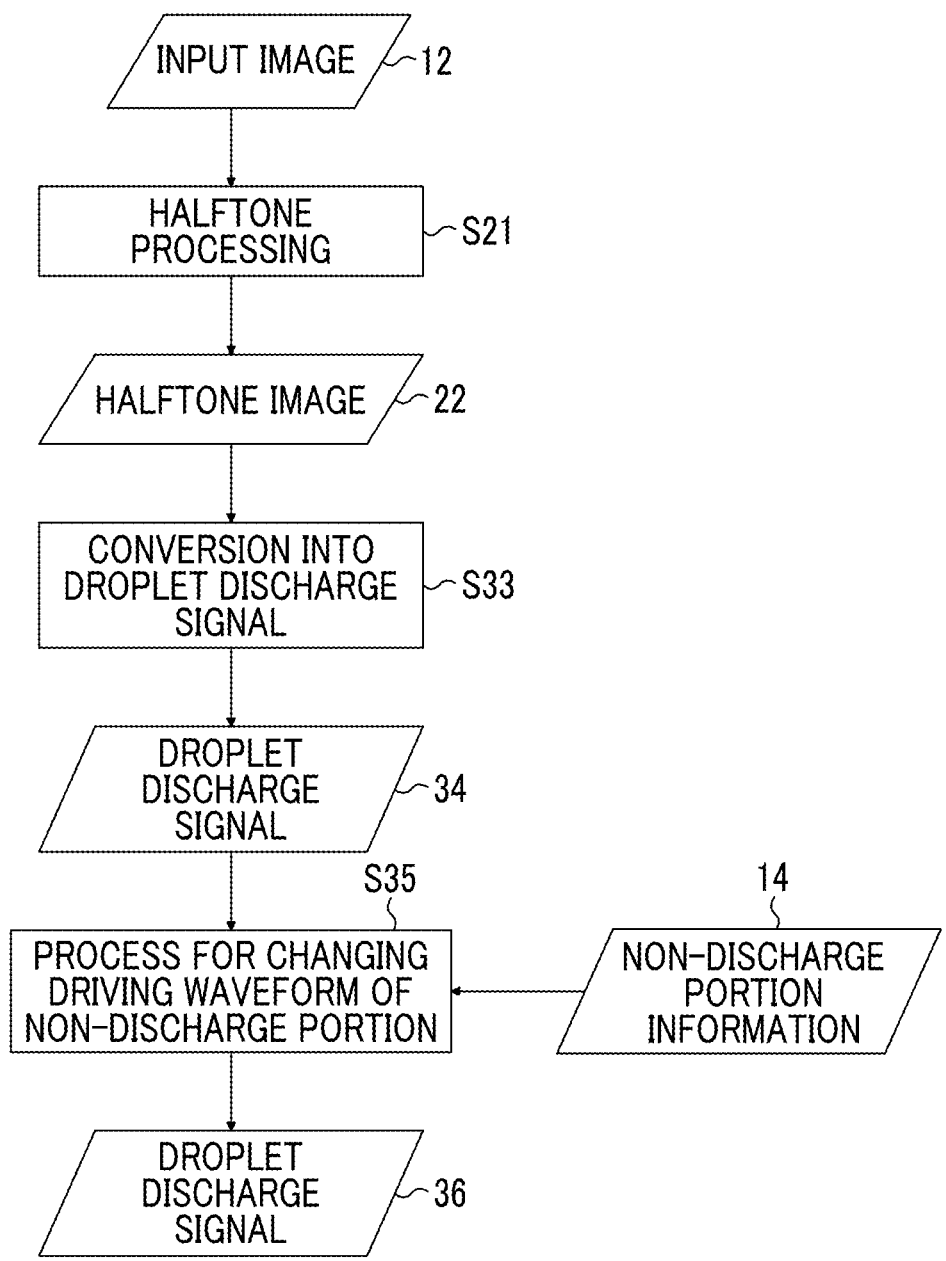
FIG. 5 is a flowchart illustrating a non-discharge correction process which is classified as a third method.
Figure 6A:
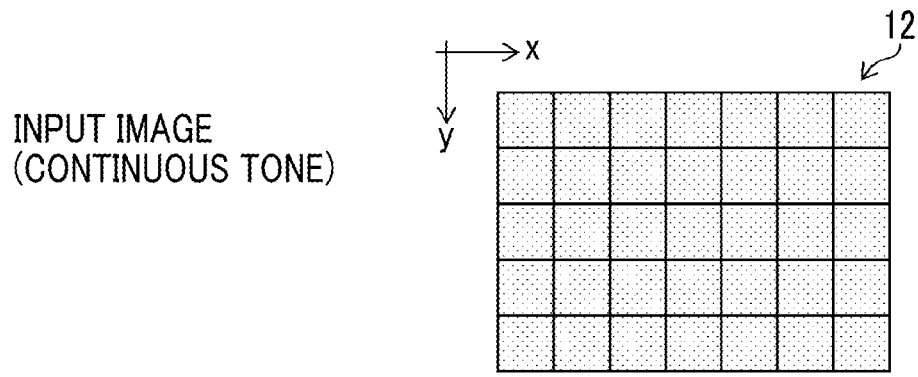
FIG. 6A is a diagram schematically illustrating image data which is treated in the non-discharge correction process classified as the third method and is a diagram schematically illustrating an input image.
Figure 6B:
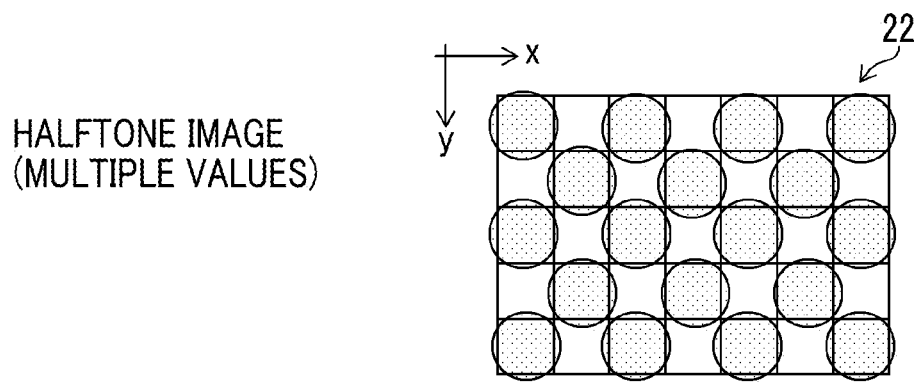
FIG. 6B is a diagram schematically illustrating image data which is treated in the non-discharge correction process classified as the third method and is a diagram schematically illustrating a halftone image.
Figure 6C:
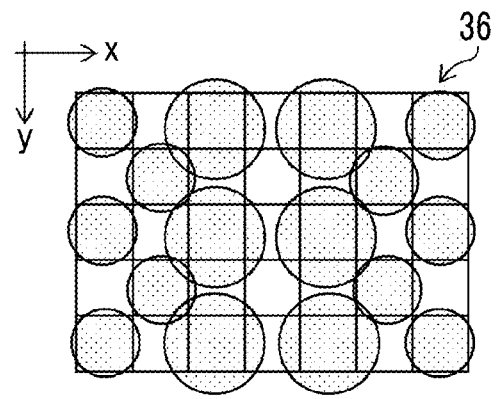
FIG. 6C is a diagram schematically illustrating image data which is treated in the non-discharge correction process classified as the third method and is a diagram schematically illustrating a dot image which is obtained by applying a non-discharge-corrected droplet discharge signal to perform discharge.

FIG. 5 is a flowchart illustrating non-discharge correction by the third method. FIGS. 6A to 6C are diagrams illustrating image data that is treated in the procedure of the non-discharge correction by the third method. FIG. 6A is a diagram schematically illustrating an input image. FIG. 6B is a diagram schematically illustrating a halftone image. FIG. 6C is a diagram schematically illustrating a dot image which is obtained by applying a non-discharge-corrected droplet discharge signal to perform discharge. In FIG. 5 and FIGS. 6A to 6C, the same or similar structures as those in FIG. 1, FIGS. 2A to 2C, FIG. 3, and FIGS. 4A to 4C are denoted by the same reference numerals and the description thereof will not be repeated.

As illustrated in FIG. 5, in the non-discharge correction method as the third method, halftone processing (Step S21) is performed for an input continuous-tone image 12 to obtain a halftone image 22 and a conversion process (Step S33) which converts the obtained halftone image 22 into a droplet discharge signal for controlling the discharge of droplets from the inkjet head is performed to generate a droplet discharge signal 34.

Then, a process which changes the discharge driving waveform of a nozzle corresponding to the non-discharge correction portion is performed on the basis of the non-discharge portion information 14 (Step S35). An ink discharge operation of the inkjet head is controlled on the basis of a droplet discharge signal 36 which is generated by the "process of changing the waveform of the non-discharge correction portion" in Step S35 to obtain an output image in which a white streak caused by the non-discharge nozzle has been corrected. The third method can be understood as a method for processing a driving signal which is a final signal.

Among three types of non-discharge correction methods which are classified into the first to third methods, the first method and the second method perform image correction in an image processing stage in which a halftone image for printing is generated and the third method corrects the waveform of the driving signal for discharge.

The technique described in the embodiments of the invention is related to the non-discharge correction process belonging to the first and second methods.

<Description of Terms>

Figure 7:
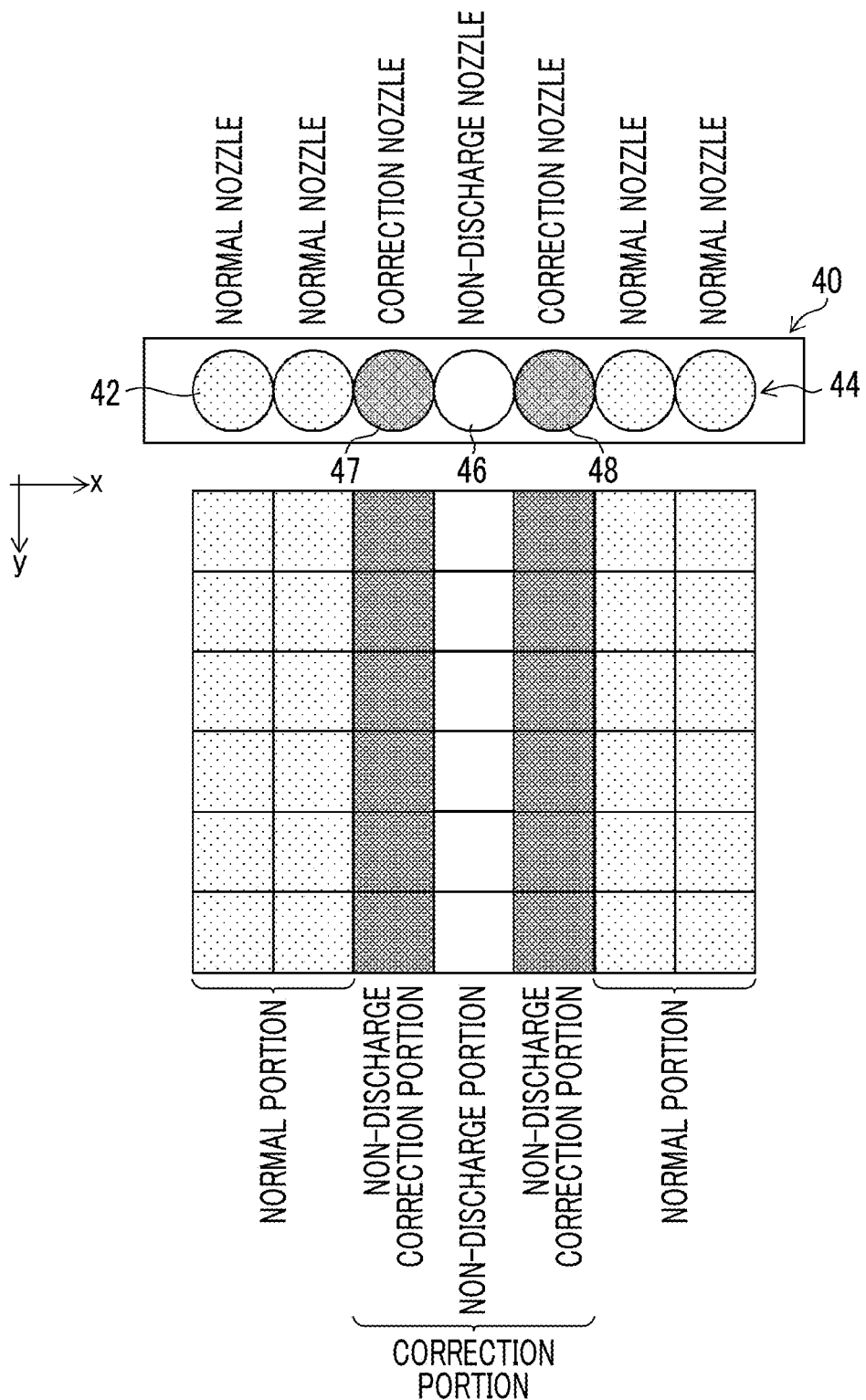
FIG. 7 is a diagram illustrating terms used in the specification.

FIG. 7 is a diagram illustrating, for example, the terms "non-discharge portion", "non-discharge correction portion", and "normal portion" used in the specification. In FIG. 7, reference numeral 40 indicates a line-type inkjet head used in a single-pass inkjet printing system. The inkjet head 40 comprises a plurality of nozzles 42 for discharging ink droplets.

It is assumed that, among a plurality of nozzles 42 forming a nozzle row 44 of the inkjet head 40 illustrated in FIG. 7, a fourth nozzle from the left side is a non-discharge nozzle 46 and the other nozzles are normal nozzles which can discharge ink droplets.

For example, the non-discharge nozzle 46 is specified in the following cases: a case in which a nozzle is not capable of discharging ink droplets due to clogging or a failure in a discharge energy generation element; and a case in which a defective nozzle in which a landing position error is greater than an allowable value is forced not to discharge ink droplets such that it is not used for recording.

When the non-discharge nozzle 46 is present in the nozzle row 44, a pixel position corresponding to the position (nozzle number k) of the non-discharge nozzle 46 in the x direction becomes a streak generation portion (recording defect portion) which is generated in a pixel column at a position (a position represented by an arrow A) corresponding to the non-discharge nozzle 46 in the y direction since the non-discharge nozzle 46 is not capable of recording dots. The pixel column at the position corresponding to the non-discharge nozzle 46 is the "non-discharge portion".

A non-discharge correction technique is applied in order to prevent an image defect, such as a white streak caused by the non-discharge portion, from being conspicuous. That is, pixel positions corresponding to a left correction nozzle 47

(nozzle number k−1) and a right correction nozzle 48 (nozzle number k+1) which are adjacent to each other, with the non-discharge nozzle 46 interposed therebetween, are used as the "non-discharge correction portions" and a correction process which increases the gradation values of pixels corresponding to the non-discharge correction portions in the input image (continuous-tone image) is performed.

In FIG. 7, the range of correction nozzles used for non-discharge correction is two nozzles which are arranged on the left and right sides of the non-discharge nozzle 46. However, the range of the correction nozzles may be a plurality of nozzles which are arranged on the left and right sides of the non-discharge nozzle 46. For example, N (N is a natural number equal to or greater than 2) nozzles which are arranged on each of the left and right sides of the non-discharge nozzle 46, that is, a total of 2×N nozzles can be set as the correction nozzles. Here, N can be appropriately designed. It is preferable that N is 2 or 3.

The non-discharge correction portions are image regions to be corrected by non-discharge correction and include at least image regions of pixel columns which correspond to the left and right pixels adjacent to the non-discharge portion. The range of N pixels which are adjacent to each of the left and right sides of the non-discharge nozzle, that is, a total of 2×N nozzles is specified as the non-discharge correction portions. In addition, an image region including the non-discharge portion and the non-discharge correction portions is referred to as a "correction portion". A portion other than the correction portion in an image, that is, a non-correction portion is referred to as the "normal portion". That is, an image region except for the non-discharge correction portion to be subjected to image correction by the non-discharge correction process and the non-discharge portion in which recording is not possible due to the non-discharge nozzle is referred to as the "normal portion". The magnitude of the gradation value is reflected in the display of the brightness (shading) of each cell of a pixel grid illustrated in FIG. 7 and a pixel with a larger gradation value has a darker color. The gradation values of the pixel positions corresponding to the left correction nozzle 47 and the right correction nozzle 48 in the non-discharge correction portions are changed to values greater than the gradation value in the normal portion.

<For Nozzle Row of Inkjet Head>

In FIG. 7, for simplicity of illustration, the nozzle row 44 in which seven nozzles 42 are arranged in a line in the x direction is illustrated. The total number of nozzles forming the nozzle row 44 is appropriately designed according to a recording resolution and a drawing width. In addition, in the actual inkjet head, the nozzles are not necessarily arranged in a line. The number of nozzles, the density of the nozzles, and the array of the nozzles are not particularly limited and can be changed in various ways.

For example, a one-dimensional nozzle array in which a large number of nozzles are arranged in a straight line (in a line) at predetermined intervals or a so-called zigzag array in which two nozzle rows are arranged such that the nozzles in each nozzle row are shifted by a pitch corresponding to half of the interval between the nozzles (the pitch between the nozzles) in a nozzle row direction may be used in order to obtain a predetermined recording resolution in the main scanning direction. In addition, in order to further improve the recording resolution, a large number of nozzles may be two-dimensionally arranged on an ink discharge surface (nozzle surface). For example, a matrix array in which three or more nozzle rows are arranged can be used.

In the case of an inkjet head having a two-dimensional nozzle array, it is considered that a projected nozzle row in which each nozzle in the two-dimensional nozzle array is projected (orthogonal projection) so as to be arranged in the width direction of the sheet (corresponding to the main scanning direction) is equivalent to a nozzle row in which nozzles are arranged substantially at regular intervals in the main scanning direction at a density that is capable of obtaining a predetermined recording resolution. The "regular intervals" mean that droplet discharge points recordable by the inkjet printing system are substantially at regular intervals. For example, the concept of "regular intervals" includes a case in which the interval between the nozzles is slightly changed in consideration of a manufacturing error or the movement of liquid droplets on a medium due to landing interference. When the projected nozzle row (also referred to as a "substantial nozzle row") is considered, the positions of the nozzles (nozzle numbers) can be associated with the projected nozzles in the order in which the projection nozzles are arranged in the main scanning direction. In the following description, a "nozzle position" indicates the position of a nozzle in the substantial nozzle array. In addition, the positional relationship between nozzles, such as "adjacent nozzles", indicates the positional relationship between the pixels in the substantial nozzle row. The position of a nozzle can be represented as an x coordinate. Therefore, the position of a nozzle can be associated with a position (x coordinate) in the x direction.

In the case of the nozzle row 44 illustrated in FIG. 7, for example, nozzle numbers i=1, 2, . . . , 7 can be given from the left end.

First Embodiment

Figure 8:
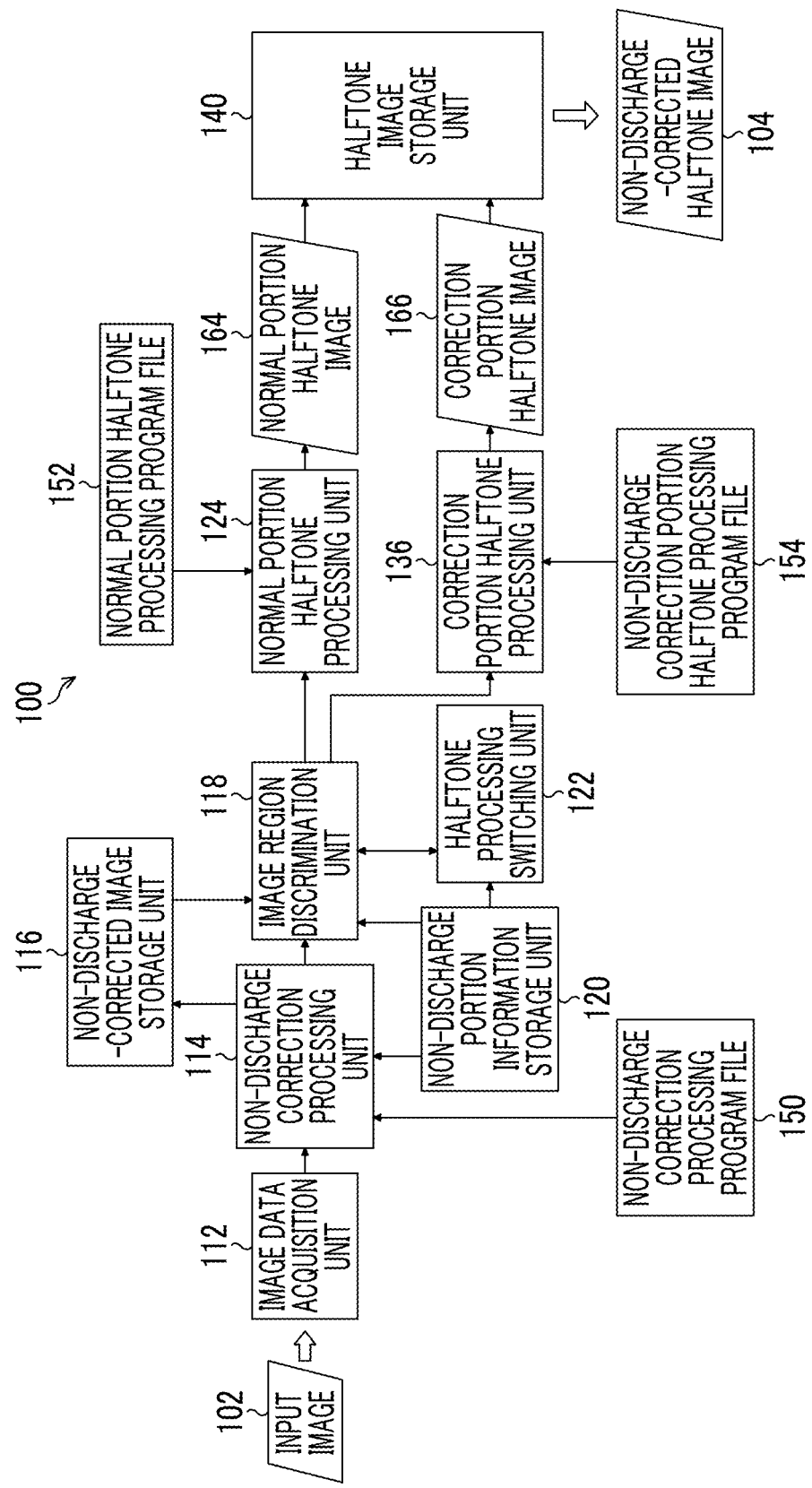
FIG. 8 is a block diagram illustrating the structure of a main portion of an image processing device according to a first embodiment of the invention.

FIG. 8 is a block diagram illustrating the structure of a main portion of an image processing device according to a first embodiment of the invention. An image processing device 100 according to the first embodiment generates a non-discharge-corrected halftone image 104 from an input image 102 which is a continuous-tone image. A non-discharge correction method of the image processing device 100 is classified as the first method.

The image processing device 100 comprises an image data acquisition unit 112, a non-discharge correction processing unit 114, a non-discharge portion information storage unit 120, a halftone processing switching unit 122, a normal portion halftone processing unit 124, a correction portion halftone processing unit 136, and a halftone image storage unit 140. The functions of each of these units are implemented by hardware and software (program) of a computer.

The normal portion halftone processing unit 124 corresponds to an example of a "first halftone processing unit" and the correction portion halftone processing unit 136 corresponds an example of a "second halftone processing unit". Halftone processing performed by the normal portion halftone processing unit 124 corresponds an example of "first halftone processing" and halftone processing performed by the correction portion halftone processing unit 136 corresponds an example of "second halftone processing".

The image processing device 100 comprises a non-discharge correction process program file 150, a normal portion halftone processing program file 152, and a non-discharge correction portion halftone processing program file 154. The non-discharge correction process program file 150, the normal portion halftone processing program file 152, and the non-discharge correction portion halftone processing program file 154 are individual files. The normal portion halftone processing program file 152 corresponds an example of a "first halftone processing program file" and the non-discharge correction portion halftone processing program file 154 corresponds an example of a "second halftone processing program file". The normal portion halftone processing program file 152 and the non-discharge correction portion halftone processing program file 154 have different program codes.

The file format of each of the program files (150, 152, and 154) is not particularly limited. For example, each of the program files (150, 152, and 154) is a dynamic link library (DLL) file. The extension of the DLL file is ".DLL". Of course, the program file is not limited to the DLL file. Each of the program files (150, 152, and 154) may be an execution file (EXE file). The extension of the EXE file is ".exe". In addition, the file formats of the files may be combined with each other. For example, the non-discharge correction process program file 150 is an EXE file and the normal portion halftone processing program file 152 and the non-discharge correction portion halftone processing program file 154 are DLL files.

As an example of the supply form of the program files (150, 152, and 154), for example, the non-discharge correction process program file 150 and the non-discharge correction portion halftone processing program file 154 can be provided from a manufacturer F which supplies an image processing module for non-discharge correction and the normal portion halftone processing program file can be a program file which is developed by a printing machine manufacturer H and is used for halftone processing.

The non-discharge correction process program file 150 is executed to implement the functions of the non-discharge correction processing unit 114. The normal portion halftone processing program file 152 is executed to implement the functions of the normal portion halftone processing unit 124. The non-discharge correction portion halftone processing program file 154 is executed to implement the functions of the correction portion halftone processing unit 136.

The image data acquisition unit 112 functions as an image input unit for acquiring the input image 102. The input image 102 is continuous-tone image data indicating the content of the image to be printed by the inkjet printing system. The image data acquisition unit 112 can include a data input terminal for acquiring image data from an external signal processing unit or another signal processing unit in the apparatus. The image data acquisition unit 112 may be a wired or wireless communication interface unit, a medium interface unit which reads data from an external storage medium (removable disk), such as a memory card, or a combination of these aspects.

The input image 102 has various data formats. Here, for simplicity of explanation, it is assumed that the input image 102 is a gradation image having the same color type, the same number of colors, and the same resolution as ink colors used by the inkjet printing system. For example, in the case of an inkjet printing system that achieves an output resolution of 1200 dpi using four color inks, that is, cyan (C), magenta (M), yellow (Y), and black (K) inks, the input image 12 is continuous-tone image data in which C, M, Y, and K each have 8 bits (256 gradations).

In a case in which image data specified by a combination of colors and a resolution format which are different from the type of ink color and resolution used in the inkjet printing system is printed, in a stage before the image data acquisition unit 112 or the non-discharge correction processing unit 114, a preprocessor (not illustrated) may perform, for example, a color conversion process or a resolution change process to convert the image data into image data with ink colors and resolution that are used in the inkjet printing system.

For example, in a case in which the original image data is RGB image data which is represented by red (R), green (G), and blue (B) color signals, a raster image processor (RIP) device corresponding to the preprocessor performs a color conversion process of converting R, G, and B into C, M, Y, and K and a resolution conversion process to convert the RGB image data into CMYK image data suitable for the inkjet printing system and inputs the converted image data to the image data acquisition unit 112.

The non-discharge correction processing unit 114 performs a correction process which corrects image data, using non-discharge portion information stored in the non-discharge portion information storage unit 120. That is, the non-discharge correction processing unit 114 performs a correction process which checks the position of a non-discharge portion in the image on the basis of the non-discharge portion information and changes the pixel value of a non-discharge correction portion according to a non-discharge correction parameter. For example, the non-discharge correction processing unit 114 performs a gradation conversion process which increases the pixel value of the non-discharge correction portion to be greater than the pixel value before correction in the input image 102 before correction in which each color is 8 bits (256 gradations) and generates a non-discharge-corrected image which is a corrected continuous-tone image in which each color is 12 bits (4096 gradations). The non-discharge-corrected image generated by the non-discharge correction processing unit 114 is stored in the non-discharge-corrected image storage unit 116.

The non-discharge portion information storage unit 120 is a storage unit that stores non-discharge portion information indicating the positional information of a non-discharge nozzle in the inkjet head of the inkjet printing system. The inkjet printing system outputs a test pattern at an appropriate time, such as before a print job starts or while a print job is being executed, and updates the non-discharge portion information on the basis of the result of reading the test pattern.

An image region discrimination unit 118 discriminates among image regions corresponding to the non-discharge portion, the non-discharge correction portion, and the normal portion in the image data, on the basis of the non-discharge portion information stored in the non-discharge portion information storage unit 120.

The halftone processing switching unit 122 performs a control process which switches the types of halftone processing on the basis of the image regions discriminated by the image region discrimination unit 118. The halftone processing switching unit 122 switches the types of halftone processing such that the halftone processing of the normal portion halftone processing unit 124 based on the normal portion halftone processing program file 152 is applied to the normal portion of the image data and the halftone processing of the correction portion halftone processing unit 136 based on the non-discharge correction portion halftone processing program file 154 is applied to the non-discharge correction portion.

The image data of the normal portion in the non-discharge-corrected image is transmitted to the normal portion halftone processing unit 124. The normal portion halftone processing unit 124 performs halftone processing which performs binary or multi-valued quantization for the given continuous-tone image data to convert the continuous-tone image data into binary or multi-valued dot data. The dot data generated by the normal portion halftone processing unit 124 is a normal portion halftone image 164. The normal portion halftone image 164 corresponds to an example of a "first halftone image". The halftone image storage unit 140 has a storage area in which the normal portion halftone image 164 is stored. The data of the normal portion halftone image 164 generated by the normal portion halftone processing unit 124 is stored in the halftone image storage unit 140. The halftone image storage unit 140 corresponds to an example of a "first halftone image storage unit".

The image data of the non-discharge correction portion in the non-discharge-corrected image is transmitted to the correction portion halftone processing unit 136. The correction portion halftone processing unit 136 performs halftone processing which performs binary or multi-valued quantization for the given continuous-tone image data to convert the continuous-tone image data into binary or multi-valued dot data.

The type of halftone processing of the correction portion halftone processing unit 136 is different from the type of halftone processing of the normal portion halftone processing unit 124.

The dot data generated by the correction portion halftone processing unit 136 is a correction portion halftone image 166. The halftone image storage unit 140 has a storage area in which the correction portion halftone image 166 is stored. The data of the correction portion halftone image 166 generated by the correction portion halftone processing unit 136 is stored in the halftone image storage unit 140. The correction portion halftone image 166 corresponds to an example of a "second halftone image". In this way, a non-discharge-corrected halftone image 104, which is a combination of the normal portion halftone image 164 and the correction portion halftone image 166, is obtained. The halftone image storage unit 140 can function as an integration processing unit that integrates the normal portion halftone image 164 with the correction portion halftone image 166.

The image data given to the normal portion halftone processing unit 124 is not necessarily limited to only the image data of the normal portion and may be image data other than the normal portion. That is, the image data given to the normal portion halftone processing unit 124 may be only the image data of the normal portion or image data other than the normal portion. For example, image data including the normal portion and the correction portion can be given to the normal portion halftone processing unit 124. In this case, the normal portion halftone image 164 includes the data of the correction portion and may be substituted in a stage in which it is integrated with the correction portion halftone image 166.

The image data given to the correction portion halftone processing unit 136 is not necessarily limited to only the image data of the non-discharge correction portion and may include image data other than the non-discharge correction portion. For example, the image data can include the image data of the non-discharge portion.

In the image processing device 100, there is a main program file (not illustrated) which controls the entire image processing process using the non-discharge correction process program file 150, the normal portion halftone processing program file 152, and the non-discharge correction portion halftone processing program file 154, and the non-discharge correction process program file 150, the normal portion halftone processing program file 152, and the non-discharge correction portion halftone processing program file 154 are executed on the basis of the main program.

A manufacturer which supplies an image processing module for non-discharge correction that can be applied to the image processing device 100 according to this embodiment can provide each manufacturer with an image processing module which is an integrated unit of, for example, the non-discharge correction process program file 150, the non-discharge correction portion halftone processing program file 154, and information about the specifications of an interface for using these units.

<For Halftone Processing Algorithm>

A halftone processing algorithm of the normal portion halftone processing unit 124 can be different from a halftone processing algorithm of the correction portion halftone processing unit 136. For example, the normal portion halftone processing unit 124 can use an error diffusion method and the correction portion halftone processing unit 136 can use a dither method using a dither mask. In some cases, the dot pattern of the non-discharge correction portion is fixed in order to achieve good non-discharge correction. It is preferable that the correction portion halftone processing unit 136 uses an algorithm using a dither mask in order to respond to the requirements. The halftone algorithm using a dither mask is referred to as a "dither-mask-type" algorithm.

Even in a case in which the normal portion halftone processing unit 124 and the correction portion halftone processing unit 136 perform halftone processing using an "error diffusion method", for example, halftone processing can be performed in different ways as follows: the gradation range of 12-bit continuous-tone image data is divided into two stages; a dot pattern for a normal portion is generated when a pixel value is in the range of 0 to 2047; and a dot pattern for a non-discharge correction portion is generated when a pixel value is in the range of 2048 to 4059.

<For Aspect in which a Plurality of Halftone Processing Program Files are Prepared>

In the image processing device 100 illustrated in FIG. 8, a plurality of types of normal portion halftone processing program files 152 may be prepared. In addition, a plurality of types of non-discharge correction portion halftone processing program files 154 may be prepared. In order to respond to various print request, it is preferable that the image processing device 100 comprises different types of normal portion halftone processing program files and different types of non-discharge correction portion halftone processing program files and the user can appropriately select the type of halftone processing.

Figure 9:
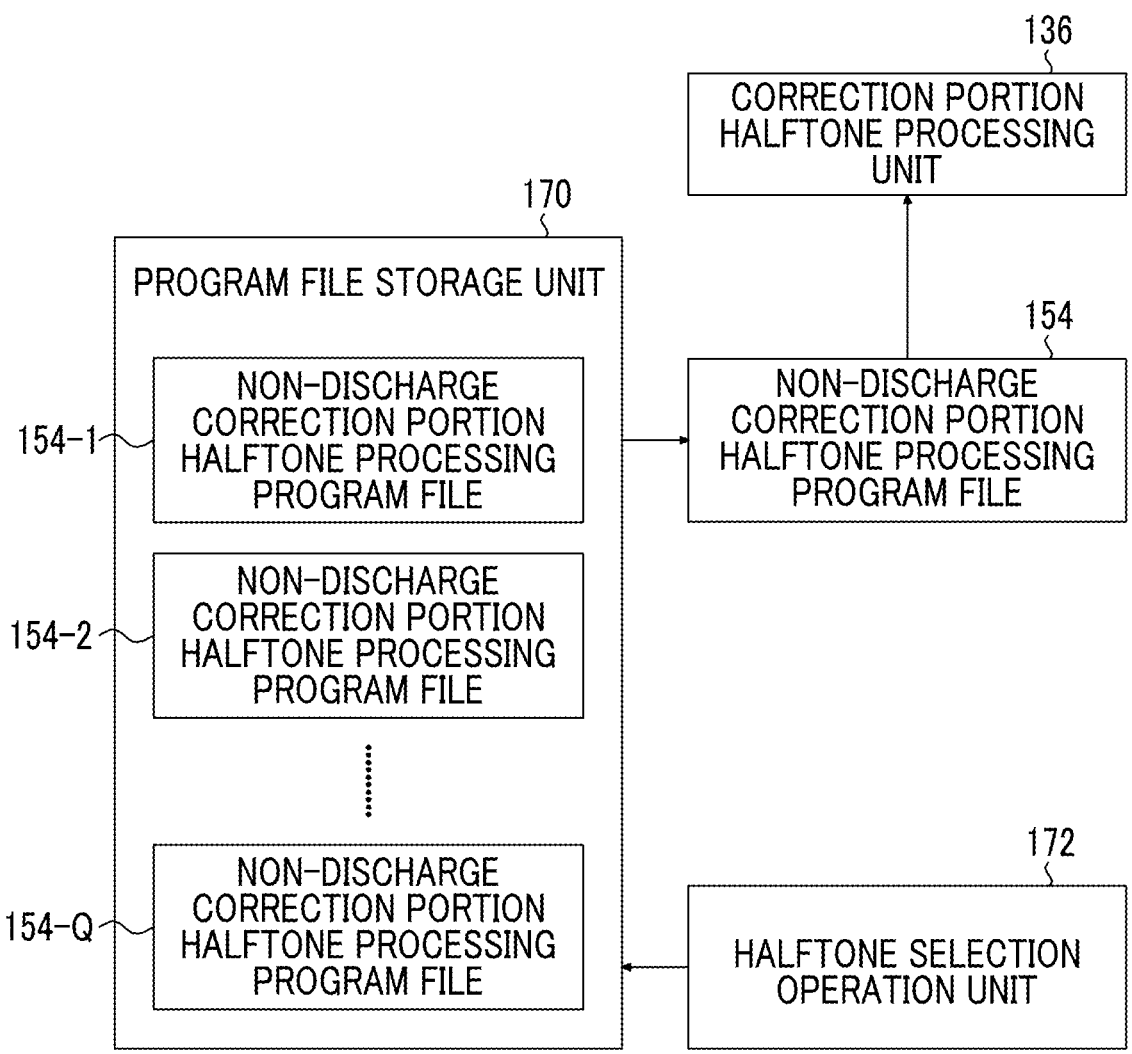
FIG. 9 is a block diagram illustrating a structure that can select one type of halftone processing from a plurality of types of halftone processing.

FIG. 9 is a block diagram illustrating a structure in which one of a plurality of types of halftone processing can be selected. In FIG. 9, the same structures as those in FIG. 8 are denoted by the same reference numerals and the description thereof will not be repeated. FIG. 9 illustrates a structure in which the type of halftone processing in the correction portion halftone processing unit 136 can be selected. Similarly, the type of halftone processing in the normal portion halftone processing unit 124 described in FIG. 8 can be selected.

The image processing device 100 described in FIG. 8 may further include a program file storage unit 170 and a halftone selection operation unit 172 illustrated in FIG. 9. The halftone selection operation unit 172 corresponds to an example of a "user interface".

The program file storage unit 170 stores a plurality of non-discharge correction portion halftone processing program files 154-1, 154-2, . . . , 154-Q. Non-discharge correction portion halftone processing program files 154-$q$ (q (q is a natural number that is equal to or greater than 1 and equal to or less than Q)=1, 2, . . . , Q (Q is a natural number that is equal to or greater than 2)) represented by reference numeral 154-$q$ are program files that perform different types of halftone processing.

For example, the plurality of non-discharge correction portion halftone processing program files 154-$q$ (q= 1, 2, . . . , Q) are stored in the same order.

The halftone selection operation unit 172 is a user interface which is used by the user to select one type of halftone processing from a plurality of types of halftone processing that are prepared as the plurality of non-discharge correction portion halftone processing program files 154-$q$ (q= 1, 2, . . . , Q). It is preferable that the halftone selection operation unit 172 is implemented by a graphical user interface (GUI).

Second Embodiment

Figure 10:
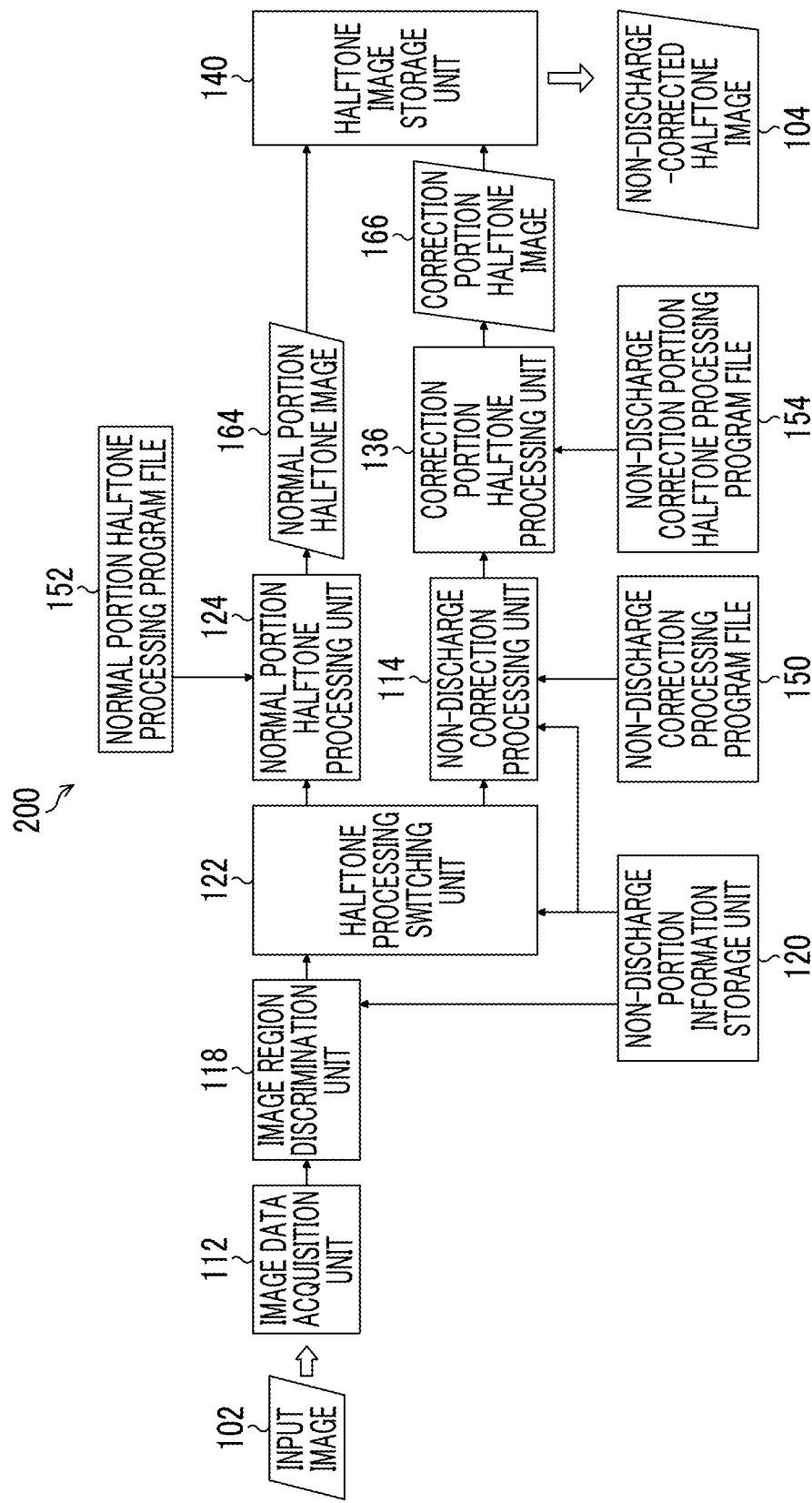
FIG. 10 is a block diagram illustrating the structure of an image processing device according to a second embodiment.

FIG. 10 is a block diagram illustrating an image processing device according to a second embodiment. In FIG. 10, the same or similar components as those in FIG. 8 are denoted by the same reference numerals and the description thereof will not be repeated.

In the first embodiment described in FIG. 8, the non-discharge correction processing unit 114 generates the non-discharge-corrected image from the input image 102 and halftone processing for normal portion and halftone processing the correction portion in the non-discharge-corrected image are switched.

In contrast, in an image processing device 200 according to the second embodiment illustrated in FIG. 10, first, the image region discrimination unit 118 discriminates among image regions corresponding to a non-discharge portion, a non-discharge correction portion, and a normal portion in the input image 102 and divides the input image 102 into the normal portion and a correction portion. Then, the halftone processing switching unit 122 switches a process between halftone processing for the normal portion and halftone processing including a non-discharge correction process for the correction portion. That is, the non-discharge correction processing unit 114 corrects pixel values in the image data of the non-discharge correction portion and the corrected image data generated by the non-discharge correction processing unit 114 is input to the correction portion halftone processing unit 136. A correction portion halftone image 166 is obtained by the correction portion halftone processing unit 136.

In the structure according to the second embodiment illustrated in FIG. 10, it is possible to obtain the same non-discharge-corrected halftone image 104 as that in the first embodiment described in FIG. 8.

<Image Processing Method According to First Embodiment and Second Embodiment>

Figure 11:
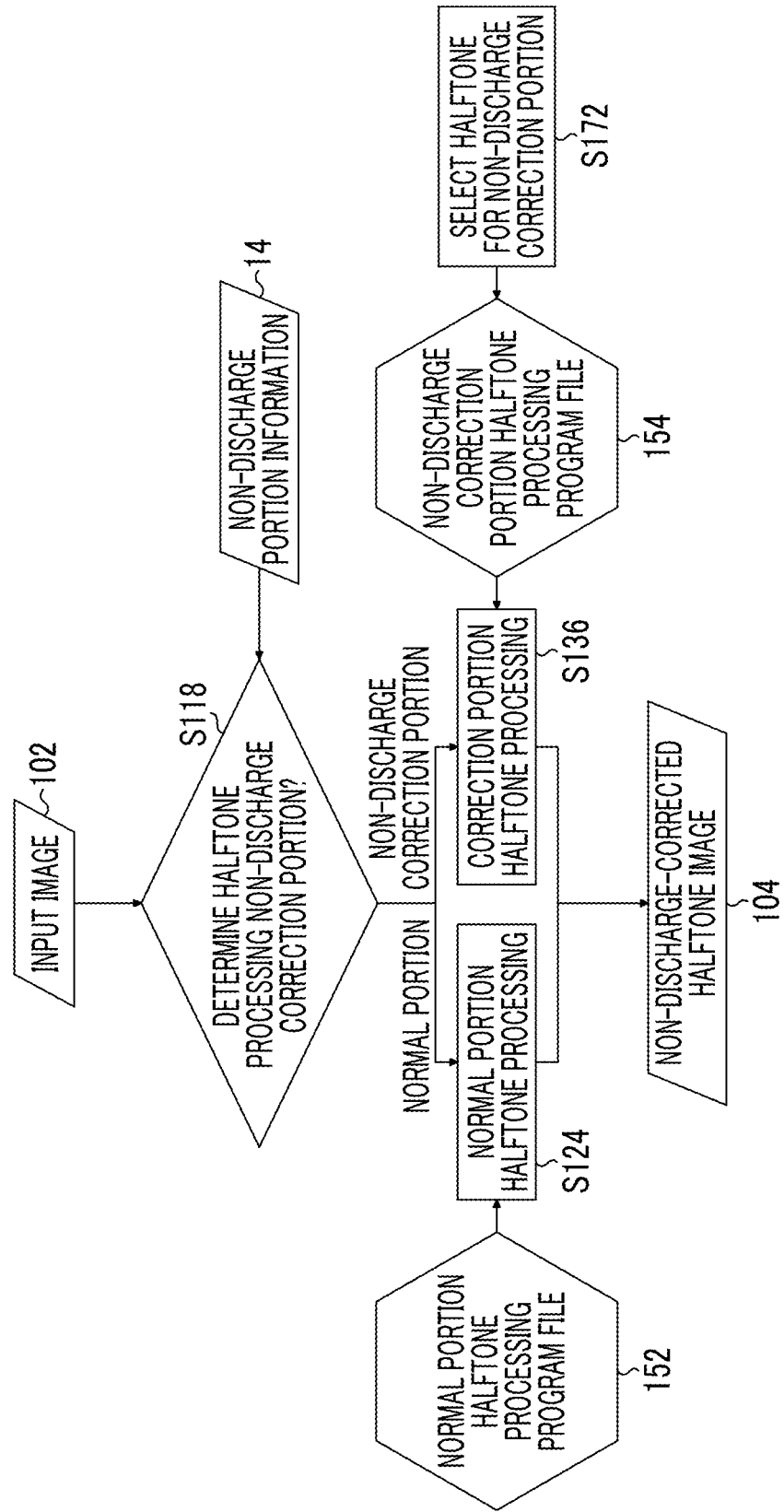
FIG. 11 is a flowchart illustrating an image processing method used in the first embodiment and the second embodiment.

FIG. 11 is a flowchart illustrating an image processing method used in the first embodiment and the second embodiment. The process described in the flowchart illustrated in FIG. 11 can be sequentially performed for each pixel of the input image 102. As illustrated in FIG. 11, a "halftone processing determination" process which discriminates between a non-discharge correction portion and a normal portion in the image data of the input image 102, using non-discharge portion information 14, and determines halftone processing to be applied to each image region is performed (Step S118).

Normal portion halftone processing (Step S124) based on the normal portion halftone processing program file 152 is performed for the image data of the normal portion on the basis of the result of the halftone processing determination process (Step S118). The normal portion halftone processing step corresponds to an example of a "first halftone processing step".

In addition, correction portion halftone processing (Step S136) based on the non-discharge correction portion halftone processing program file 154 is performed for the image data of the non-discharge correction portion. The correction portion halftone processing step corresponds to an example of a "second halftone processing step".

In a case in which a plurality of types of non-discharge correction portion halftone processing are prepared as described in FIG. 9, the user selects a non-discharge correction portion halftone processing. In a case in which halftone processing selection means is provided, a step of selecting a non-discharge correction portion halftone processing is added, as illustrated as Step S172 in FIG. 11, and the non-discharge correction portion halftone processing program file 154 related to the selection of the user is applied.

In a case in which a plurality of types of normal portion halftone processing program files 152 for different types of normal portion halftone processing are prepared, which is not illustrated in the drawings, the user performs an operation of selecting a normal portion halftone processing.

The step of selecting the non-discharge correction portion halftone processing (Step S172) or the step of selecting the normal portion halftone processing (not illustrated) is added in a case in which a plurality of types of halftone processing are prepared. Therefore, in the case of a device without a halftone selection function, the step of selecting the non-discharge correction portion halftone processing (Step S172) or the step of selecting the normal portion halftone processing (not illustrated) is omitted.

The normal portion halftone image 164 generated by the normal portion halftone processing (Step S124) (see FIG. 8 and FIG. 10) and the correction portion halftone image 166 (see FIG. 8 and FIG. 10) generated by the correction portion halftone processing (Step S136 in FIG. 11) are combined to generate a non-discharge-corrected halftone image 104.

In the case of the image processing device 100 according to the first embodiment (FIG. 8), a non-discharge correction processing step which is performed by the non-discharge correction processing unit 114 is provided in a stage before the halftone processing determination step (Step S118), which is not illustrated in FIG. 11. The non-discharge correction processing step corresponds to an example of a "non-discharge correction processing step".

In the case of the image processing device 200 according to the second embodiment (FIG. 10), the non-discharge correction processing step performed by the non-discharge correction processing unit 114 is provided in a stage after the halftone processing determination step (Step S118) and before a correction portion halftone processing step (Step S136) in FIG. 11.

Third Embodiment

Figure 12:
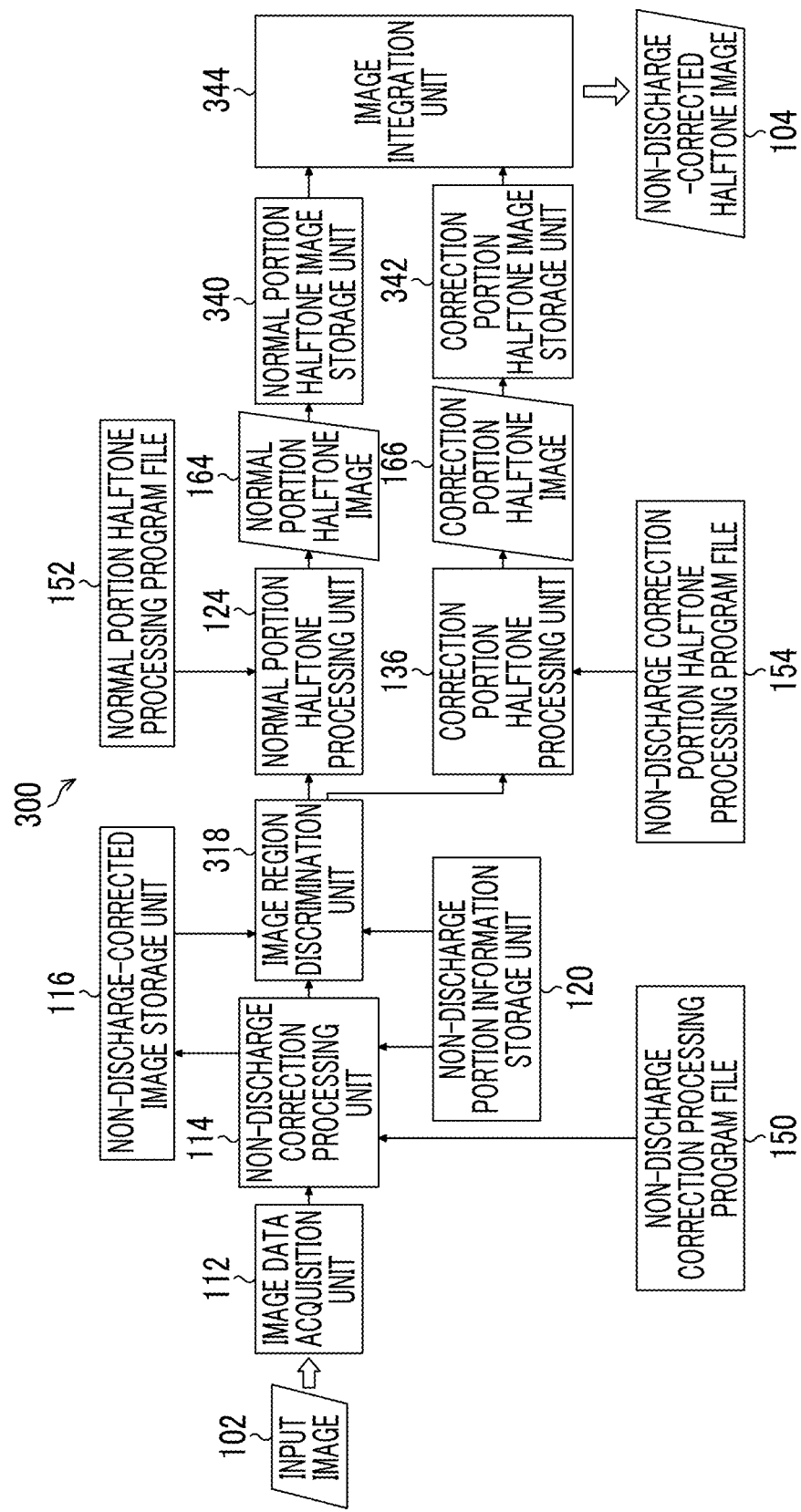
FIG. 12 is a block diagram illustrating the structure of an image processing device according to a third embodiment.

FIG. 12 is a block diagram illustrating an image processing device 300 according to a third embodiment. In FIG. 12, the same or similar components as those in FIG. 8 are denoted by the same reference numerals and the description thereof will not be repeated.

The image processing device 300 illustrated in FIG. 12 comprises an image region division unit 318, instead of the image region discrimination unit 118 and the halftone processing switching unit 122 of the image processing device 100 illustrated in FIG. 8. The image region division unit 318 performs an image division process which checks image regions corresponding to a normal portion, a non-discharge portion, and a non-discharge correction portion in given image data on the basis of non-discharge portion information and divides the given image data into image data of the normal portion and image data of the correction portion. The image region division unit 318 corresponds to an example of an "image division processing unit". The image data of the normal portion is referred to as a "normal portion image" and the image data of the correction portion is referred to as a "correction portion image". In a case in which there are a plurality of non-discharge portions, a plurality of correction portion images are obtained.

The image division process performed by the image region division unit 318 may separate the normal portion image and the correction portion image so as to be distinguished from each other, may divide the image data into the normal portion image and the correction portion image as files, or may perform the division process so as to designate output memory addresses in a program.

In this way, the image data is divided into the normal portion image and the correction portion image by the image region division unit 318. The normal portion image is transmitted to the normal portion halftone processing unit 124 and the correction portion image is transmitted to the correction portion halftone processing unit 136.

The output destination of the normal portion halftone image generated by the normal portion halftone processing unit 124 may be a file or a designated area of the memory. For the output destination of the correction portion halftone image generated by the correction portion halftone processing unit 136, similarly, the correction portion halftone image may be output as a file or may be output to a designated area of the memory.

The image processing device 300 illustrated in FIG. 12 comprises a normal portion halftone image storage unit 340, a correction portion halftone image storage unit 342, and an image integration unit 344. The normal portion halftone image storage unit 340 is means for storing the normal portion halftone image 164 generated by the normal portion halftone processing unit 124. The normal portion halftone image storage unit 340 corresponds to an example of a "first halftone image storage unit". The correction portion halftone image storage unit 342 is means for storing the correction portion halftone image 166 generated by the correction portion halftone processing unit 136. The image integration unit 344 performs an image integration process which integrates the normal portion halftone image 164 with the correction portion halftone image 166 to generate the non-discharge-corrected halftone image 104. The image integration unit 344 corresponds to an example of an "integration processing unit".

The normal portion halftone image storage unit 340 and the correction portion halftone image storage unit 342 can be configured as a portion of the storage area of the halftone image storage unit 140 described in FIG. 8.

In the case of a structure in which the normal portion halftone image 164 generated by the normal portion halftone processing unit 124 and the correction portion halftone image 166 generated by the correction portion halftone processing unit 136 are output to designated addresses in the memory and are integrated with each other in the memory to form the non-discharge-corrected halftone image 104, the memory serving as a storage unit in which the normal portion halftone image 164 and the correction portion halftone image 166 are stored functions as the image integration unit 344. That is, one memory which is used as a halftone image storage unit can function as the normal portion halftone image storage unit 340, the correction portion halftone image storage unit 342, and the image integration unit 344.

The third embodiment described in FIG. 12 can have the same modification structure as the second embodiment described in FIG. 10. The non-discharge correction processing unit 114 illustrated in FIG. 12 can be provided in a stage after the image region division unit 318 and before the correction portion halftone processing unit 136, which is not illustrated in the drawings.

<Image Processing Method According to Third Embodiment>

Figure 13:
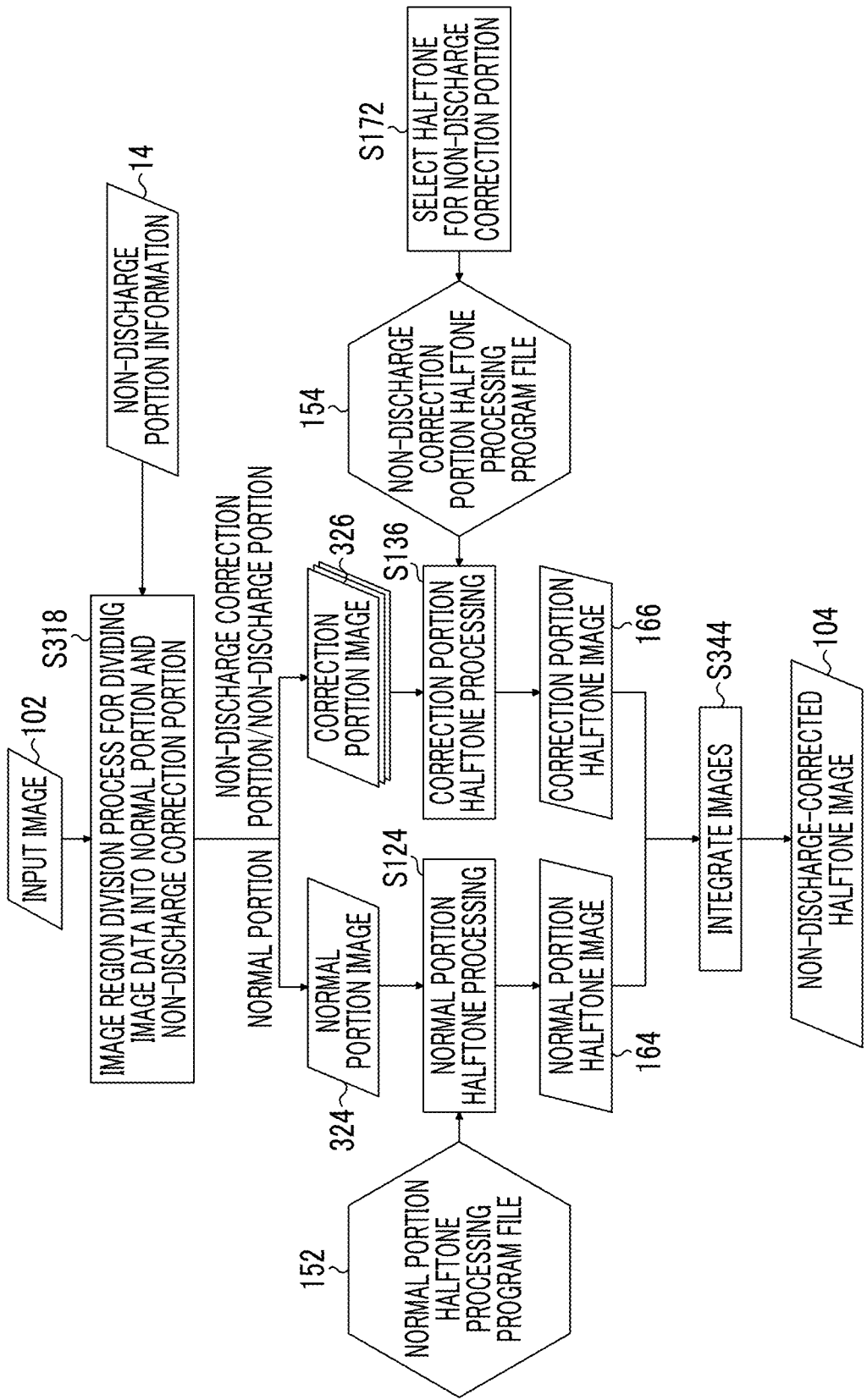
FIG. 13 is a flowchart illustrating an image processing method used in the image processing device according to the third embodiment.
Figure 14:
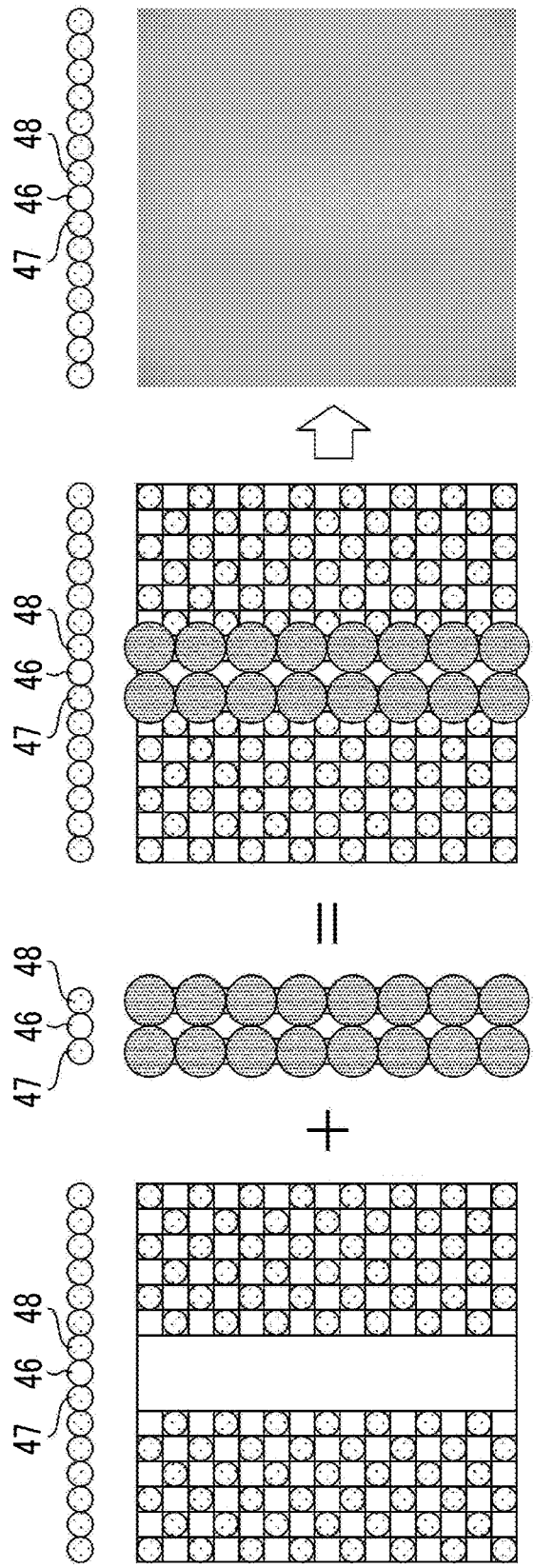
FIGS. 14A-14D are diagrams illustrating an example in which a dot pattern of a normal portion is similar to a dot pattern of a non-discharge correction portion.
Figure 15:
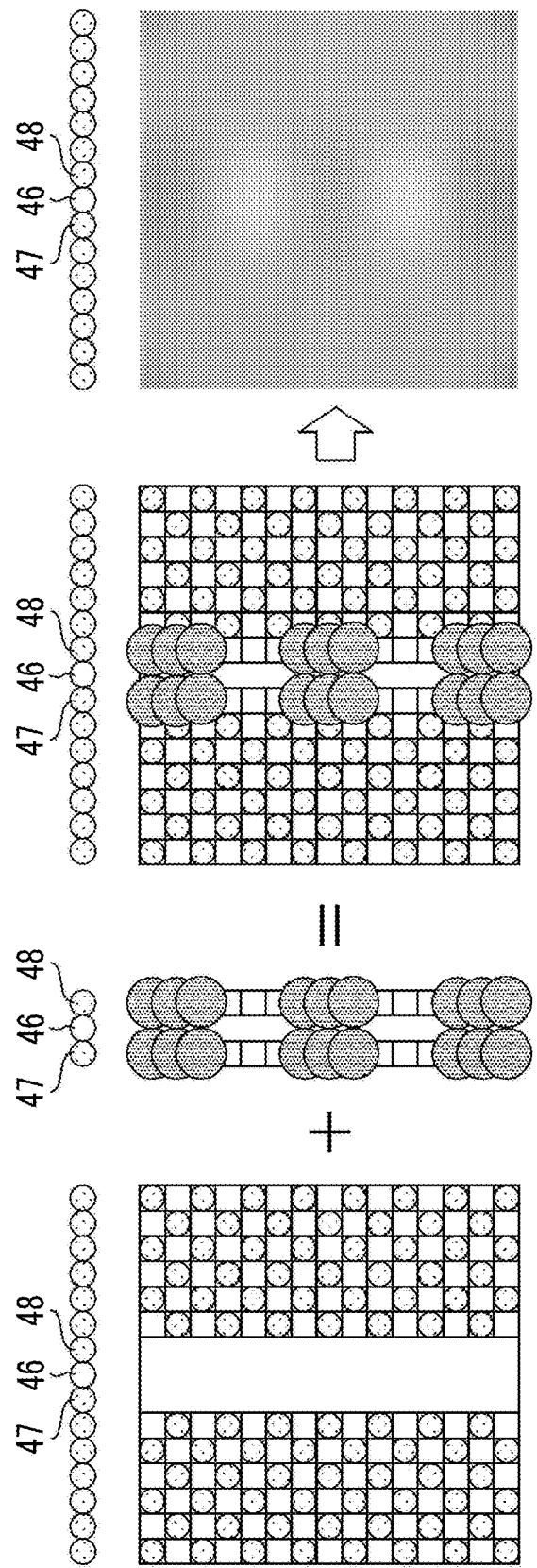
FIGS. 15A-15D are diagrams illustrating an example in which a dot pattern of a normal portion is different from a dot pattern of a non-discharge correction portion.

FIG. 13 is a flowchart illustrating an image processing method used in an image processing method according to the third embodiment. In FIG. 13, the same or similar components as those in the flowchart described in FIG. 11 are denoted by the same reference numerals and the description thereof will not be repeated.

As illustrated in FIG. 13, an image region division process which divides the image data of the input image 102 into a normal portion and a non-discharge correction portion is performed using the non-discharge portion information 14 (Step S318). The image data is divided into a normal portion image 324 as image data corresponding to the normal portion and a correction portion image 326 as image data corresponding to a correction portion including the non-discharge correction portion by the image region division process (Step S318).

Normal portion halftone processing (Step S124) is performed for the normal portion image 324 to obtain the normal portion halftone image 164.

In addition, correction portion halftone processing (Step S136) is performed for the correction portion image 326 to generate the correction portion halftone image 166.

Then, an image integration process which integrates the generated normal portion halftone image 164 with the generated correction portion halftone image 166 is performed (Step S344). As a result, the non-discharge-corrected halftone image 104 is obtained.

In the case of the image processing device 300 according to the third embodiment (FIG. 12), a non-discharge correction processing step performed by the non-discharge correction processing unit 114 is provided in a stage before the image region division process in Step S318, which is not illustrated in FIG. 13.

As a modification of the third embodiment, a non-discharge correction processing step which corrects the pixel value of the non-discharge correction portion may be performed in a stage after the image region division process (Step S318) and before the correction portion halftone processing (Step S136) in FIG. 13.

<Artifact Problems Caused by Difference Between Arrangement of Dots in Non-Discharge Correction Portion and Arrangement of Dots in Normal Portion>

Here, the problems of an artifact generated due to the difference between the arrangement of dots in the non-discharge correction portion and the arrangement of dots in the normal portion will be described.

Even in a case in which the amount of ink from correction nozzles is appropriately adjusted by a non-discharge correction technique, when the characteristics of the dot pattern of the normal portion are different from the characteristics of the dot pattern of the non-discharge correction portion, it is difficult to completely remove streaks in the non-discharge portion. For example, in the printing industry, in many cases, the observer looks at a printed matter closely, carefully observes a streak-shaped image defect in the printed matter, and evaluates the printed matter. Therefore, when the normal portion and the correction portion have different dot arrangement structures and have different microscopic pattern shapes, a difference in granularity is observed due to a difference between spatial frequencies even if the normal portion and the correction portion have the same density in a macroscopic view. As a result, an unnatural texture (artifact) is generated, which causes problems.

The problems of the artifact caused by the difference between the arrangement of dots in the non-discharge correction portion and the arrangement of dots in the normal portion will be described in detail with reference to FIGS. 14A to 15D. FIG. 14A to FIG. 14D illustrate an example in which the dot pattern of the normal portion is similar to the dot pattern of the non-discharge correction portion.

FIG. 14A illustrates the dot pattern of the normal portion and FIG. 14B illustrates the dot pattern of the non-discharge correction portion. In both the patterns, dot-on (a dot is present) and dot-off (a dot is absent) are alternately repeated along a column of pixels arranged in the y direction. In addition, the average amount of ink in a correction portion which includes a non-discharge portion corresponding to a non-discharge nozzle 46 and a non-discharge correction portion corresponding to two correction nozzles 47 and 48 adjacent to the non-discharge nozzle 46 is equal to the average amount of ink in a normal portion which is a non-correction portion.

FIG. 14C is a pattern which is a combination of the dot pattern of the normal portion illustrated in FIG. 14A and the dot pattern of the non-discharge correction portion illustrated in FIG. 14B and illustrates the dot pattern of a non-discharge-corrected halftone image obtained by the non-discharge correction process.

FIG. 14D illustrates the visual appearance of the printing result of the dot pattern illustrated in FIG. 14C. FIG. 14D can be obtained by performing a filtering process which applies a visual transfer function (VTF) corresponding to the visual characteristics of the human eye to the dot pattern illustrated in FIG. 14C.

When a printed matter formed by the dot pattern (non-discharge-corrected halftone image) illustrated in FIG. 14C is observed, an image in which streaks have been corrected so as not to be conspicuous by a non-discharge correction effect is obtained as illustrated in FIG. 14D.

FIG. 14A to FIG. 15D illustrate an example in which the dot pattern of a normal portion is different from the dot pattern of a non-discharge correction portion.

FIG. 15A illustrates the dot pattern of the normal portion and FIG. 15B illustrates the dot pattern of the non-discharge correction portion. FIG. 15A is the same as FIG. 14A. FIG. 15B differs from FIG. 14B in a dot arrangement structure of the non-discharge correction portion. That is, in the dot pattern of the non-discharge correction portion illustrated in FIG. 15B, a pattern in which dots are on three consecutive pixels and no dots are on three consecutive pixels in the y direction is periodically repeated.

In contrast, in the dot pattern of the normal portion, dots are arranged on every other pixel in the y direction. Therefore, there is a large difference between the two patterns. However, the average amount of ink in a correction portion which includes the non-discharge portion corresponding to the non-discharge nozzle 46 and the non-discharge correction portion corresponding to two correction nozzles 47 and 48 adjacent to the non-discharge nozzle 46 is equal to the average amount of ink in the normal portion which is a non-correction portion.

FIG. 15C is a pattern which is a combination of the dot pattern of the normal portion illustrated in FIG. 15A and the dot pattern of the non-discharge correction portion illustrated in FIG. 15B and illustrates the arrangement of dots in a non-discharge-corrected halftone image obtained by the non-discharge correction process.

FIG. 15D illustrates the visual appearance of the printing result of the dot pattern illustrated in FIG. 15C. FIG. 15D can be obtained by performing a filtering process which applies a visual transfer function (VTF) corresponding to the visual characteristics of the human eye to the dot pattern illustrated in FIG. 15C.

When a printed matter of the halftone image subjected to the non-discharge correction process illustrated in FIG. 15C is observed, the pattern (shading pattern) of the non-discharge correction portion is seen as an unnatural texture, as illustrated in FIG. 15D, even if the average amounts of ink in each column of pixels which are arranged in the y direction before and after correction are equal to each other.

That is, when the arrangement of dots in the non-discharge correction portion is determined, without considering the dot pattern of the normal portion, during non-discharge correction, shading unevenness caused by the difference between the dot arrangement structures of the normal portion and the non-discharge correction portion is seen.

This is an artifact (texture) which is generated in a case in which the spatial frequency characteristics of the dot pattern of the non-discharge correction portion are different from the spatial frequency characteristics of the dot pattern of the normal portion. It is preferable to prevent the generation of the artifact.

It is preferable to adopt a structure in which the result of normal portion halftone processing for the normal portion is used as an input in correction portion halftone processing for the non-discharge correction portion, as means for solving the problem of the artifact caused by the difference between the arrangement of dots in the non-discharge correction portion and the arrangement of dots in the normal portion.

A fourth embodiment and a fifth embodiment will be described in detail below.

Fourth Embodiment

Figure 16:
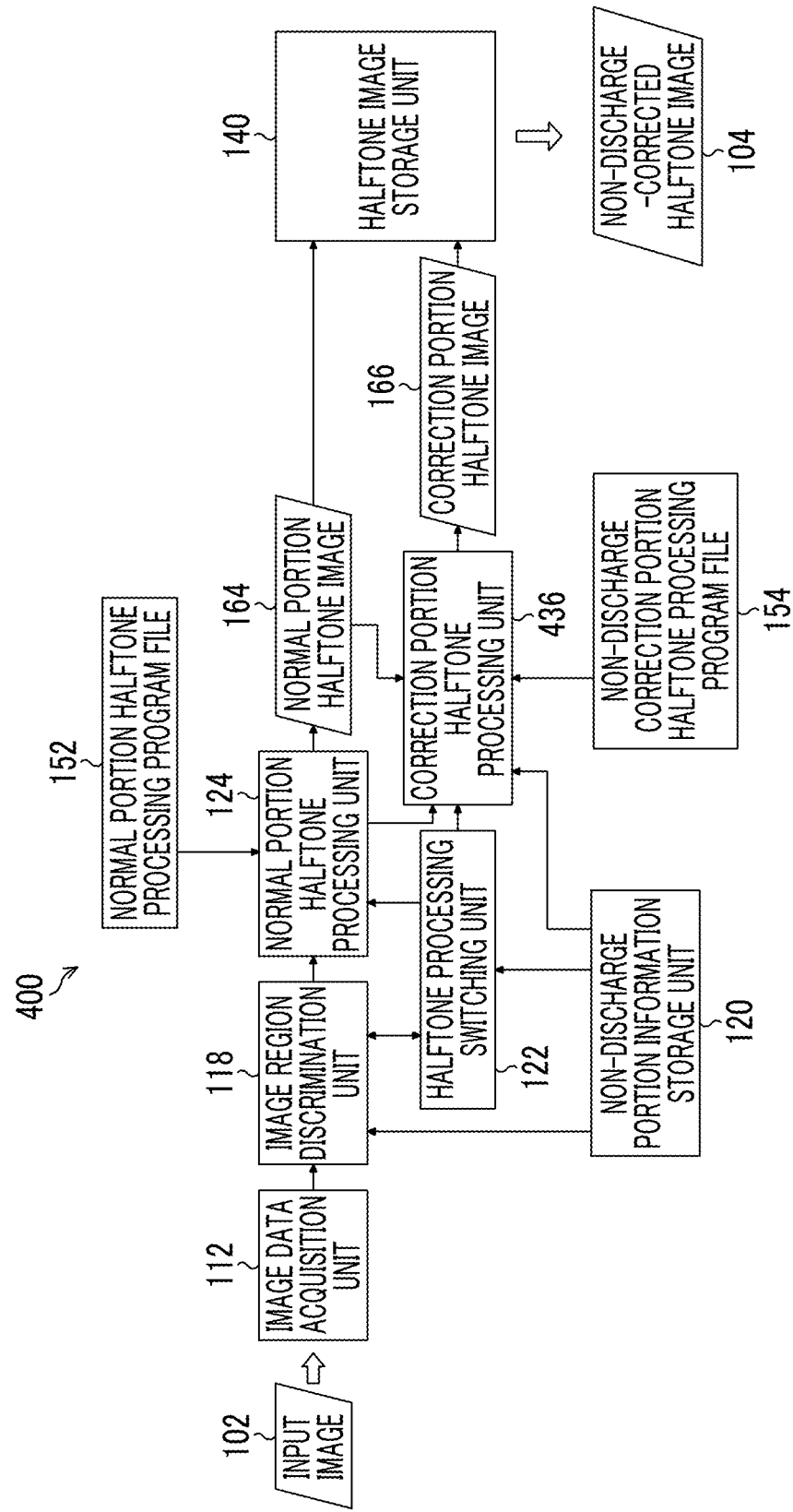
FIG. 16 is a block diagram illustrating the structure of an image processing device according to a fourth embodiment.

FIG. 16 is a block diagram illustrating the structure of an image processing device 400 according to the fourth embodiment. In the structure illustrated in FIG. 16, the same or similar components as those in the structure illustrated in FIG. 8 are denoted by the same reference numerals and the description thereof will not be repeated.

A non-discharge correction method in the image processing device 400 illustrated in FIG. 16 is classified as the second method. The image processing device 400 discriminates between a normal portion and a non-discharge correction portion in image data of the input image 102, using the image region discrimination unit 118, switches halftone processing on the basis of the discrimination result, using the halftone processing switching unit 122, and performs halftone processing in two stages.

That is, the normal portion halftone processing unit 124 performs halftone processing as first-stage halftone processing and a correction portion halftone processing unit 436 performs halftone processing as second-stage halftone processing.

Data generated by the normal portion halftone processing unit 124 is given as an input to the correction portion halftone processing unit 436. An example of the data which is generated by the normal portion halftone processing unit 124 and is given as an input to the correction portion halftone processing unit 436 can be the data of the normal portion halftone image 164 generated by the normal portion halftone processing unit 124.

Another example of the data which is generated by the normal portion halftone processing unit 124 and is given as an input to the correction portion halftone processing unit 436 can be cumulative error data obtained in a case in which the normal portion halftone processing unit 124 performs an error diffusion process.

FIG. 16 illustrates an example in which the data of the normal portion halftone image 164 generated by the normal portion halftone processing unit 124 is input to the correction portion halftone processing unit 436. In this case, image data including the normal portion and the correction portion is input to the first-stage normal portion halftone processing unit 124 and a normal portion halftone image 164 including the normal portion and the correction portion is obtained as the output of the normal portion halftone processing unit 124. The normal portion halftone image 164 corresponds to a halftone image before non-discharge correction. The obtained normal portion halftone image 164 is input to the correction portion halftone processing unit 436 and the correction portion halftone processing unit 436 performs a process of changing the dot pattern of the non-discharge correction portion.

The correction portion halftone processing unit 436 performs halftone processing, which changes a dot pattern on the basis of the non-discharge correction portion halftone processing program file 154, for an image region corresponding to the non-discharge correction portion in the input normal portion halftone image 164 and obtains a correction portion halftone image 166.

In this way, a non-discharge-corrected halftone image 104 in which the dot pattern of the non-discharge correction portion, which is a portion of the normal portion halftone image 164, has been changed to the dot pattern of the correction portion halftone image 166 is generated.

Figure 17:
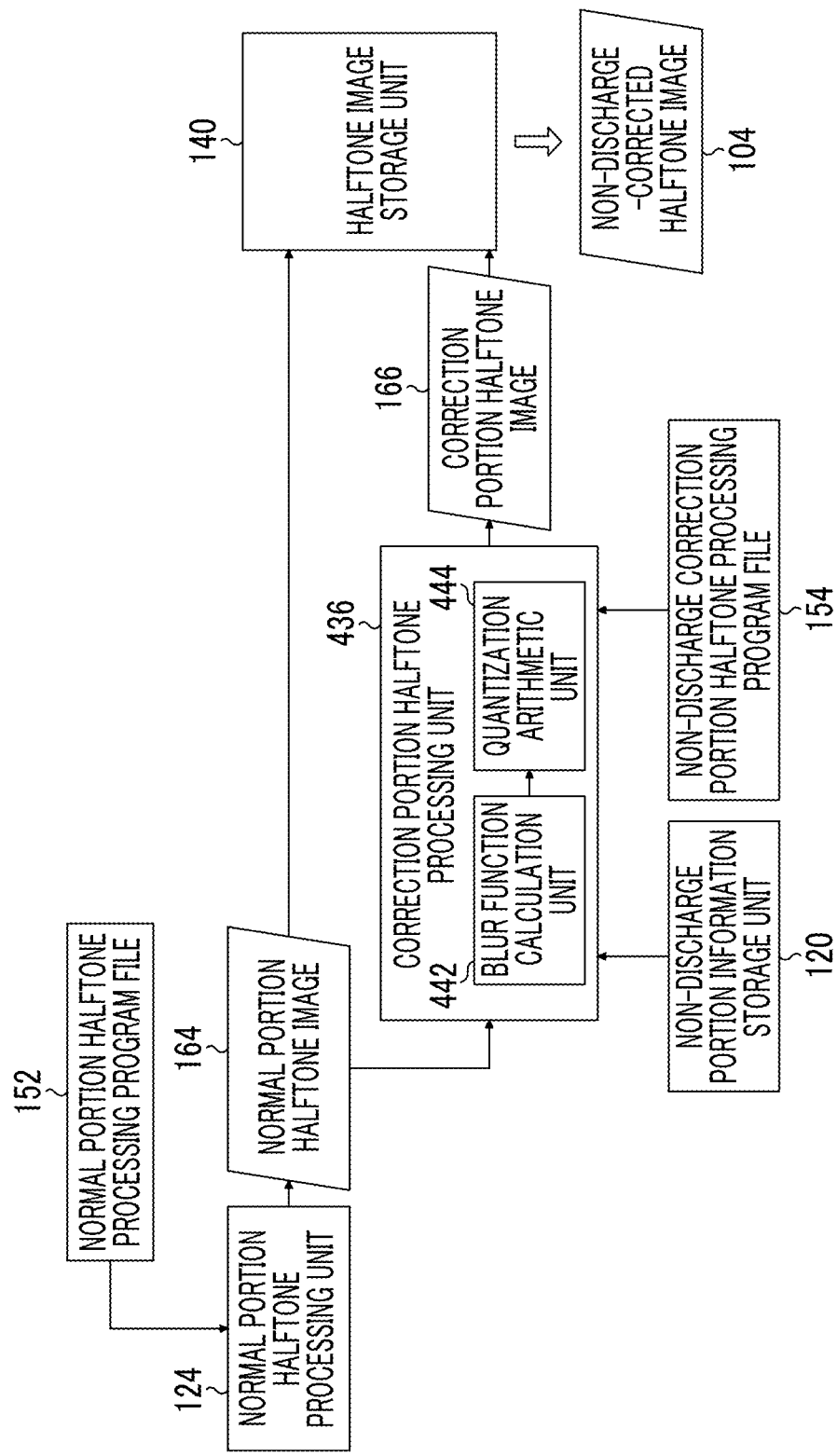
FIG. 17 is a block diagram illustrating an example of the structure of a correction portion halftone processing unit which is a main portion of the image processing device illustrated in FIG. 16.

FIG. 17 is a block diagram illustrating an example of the structure of the correction portion halftone processing unit 436 in the image processing device 400 described in FIG. 16. In FIG. 17, the same components as those in FIG. 16 are denoted by the same reference numerals and the description thereof will not be repeated.

The correction portion halftone processing unit 436 illustrated in FIG. 17 comprises a blur function calculation unit 442 and a quantization arithmetic unit 444. The blur function calculation unit 442 performs a process which applies a blur function to the non-discharge correction portion of the normal portion halftone image 164 input to the correction portion halftone processing unit 436 to change the non-discharge correction portion to continuous-tone image data. The blur function calculation unit 442 corresponds to an example of an "arithmetic processing unit that applies a blur function".

For example, a Dooley's visual transfer function (VTF) can be used as the blur function. In addition, a Gaussian function can be used as another blur function. The blur function may be defined as a point spread function (PSF). The blur function may be any function as long as it can obtain continuous-tone image data in which the dot pattern of a halftone image before correction is reflected. The blur function is not particularly limited.

The quantization arithmetic unit 444 which is an arithmetic unit that quantizes the image data generated by the blur function calculation unit 442 to convert the image data into binary or multi-value discrete dot data. The correction portion halftone image 166 generated by the quantization arithmetic unit 444 has some of the frequency characteristics of the original normal portion halftone image 164. Therefore, it is possible to obtain the correction portion halftone image 166 having frequency characteristics similar to those of the normal portion halftone image 164. The non-discharge-corrected halftone image 104 in which the normal portion and the non-discharge correction portion are well connected to each other is obtained.

In the case of the image processing device 400 according to the fourth embodiment, the correction portion halftone processing unit 436 functions as a non-discharge correction processing unit.

Fifth Embodiment

Figure 18:
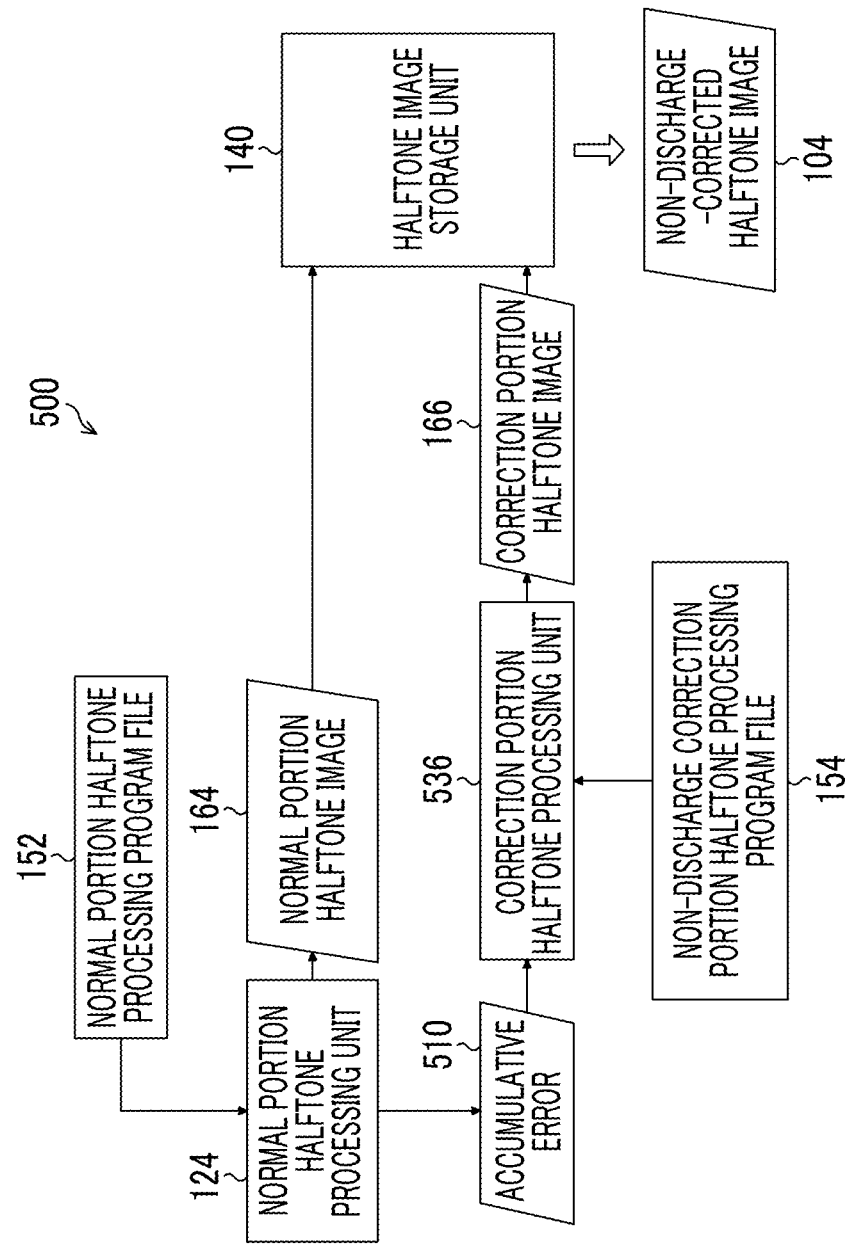
FIG. 18 is a block diagram illustrating the structure of a main portion of a fifth embodiment.

Next, a fifth embodiment will be described. FIG. 18 is a block diagram illustrating the structure of a main portion according to the fifth embodiment. The overall structure of an image processing device 500 according to the fifth embodiment is the same as that illustrated in FIG. 8 and thus the description thereof will not be repeated. FIG. 18 illustrates a main portion of the image processing device 500 according to the fifth embodiment which is different from that illustrated in FIG. 1. In FIG. 18, the same or similar components as those in FIG. 8 are denoted by the same reference numerals and the description thereof will not be repeated.

In the image processing device 500 according to the fifth embodiment, an error diffusion process is used in the halftone processing of the normal portion halftone processing unit 124. Data of a cumulative error 510 which is diffused to the position of pixels in the non-discharge correction portion among quantization errors which are generated by the error diffusion process of the normal portion halftone processing unit 124 is given as an input to a correction portion halftone processing unit 536.

The correction portion halftone processing unit 536 performs a quantization process, using an error diffusion process different from that used by the normal portion halftone processing unit 124, when converting image data corresponding to the non-discharge correction portion into dot data. The correction portion halftone processing unit 536 performs the error diffusion process for the non-discharge correction portion, using the cumulative error 510 given from the normal portion halftone processing unit 124 as initial error data, to generate a correction portion halftone image 166.

That is, the correction portion halftone processing unit 536 accumulates diffusion error data for the non-discharge correction portion, which is generated by the error diffusion process for the normal portion, for each pixel, stores the accumulated diffusion error data as the cumulative error 510, and performs the error diffusion process for the non-discharge correction portion, using the cumulative error 510 as initial error data, with reference to the stored cumulative error 510.

According to this structure, it is possible to reflect the error which occurs due to the quantization of the normal portion in adjacent non-discharge correction portions. Therefore, the boundary portions between the normal portion and the non-discharge correction portions are smoothly connected to each other.

The structure described in FIG. 18 can be combined with the image processing device 200 described in FIG. 10 or the image processing device 300 described in FIG. 12.

<Image Processing Method According to Fourth Embodiment and Fifth Embodiment>

Figure 19:
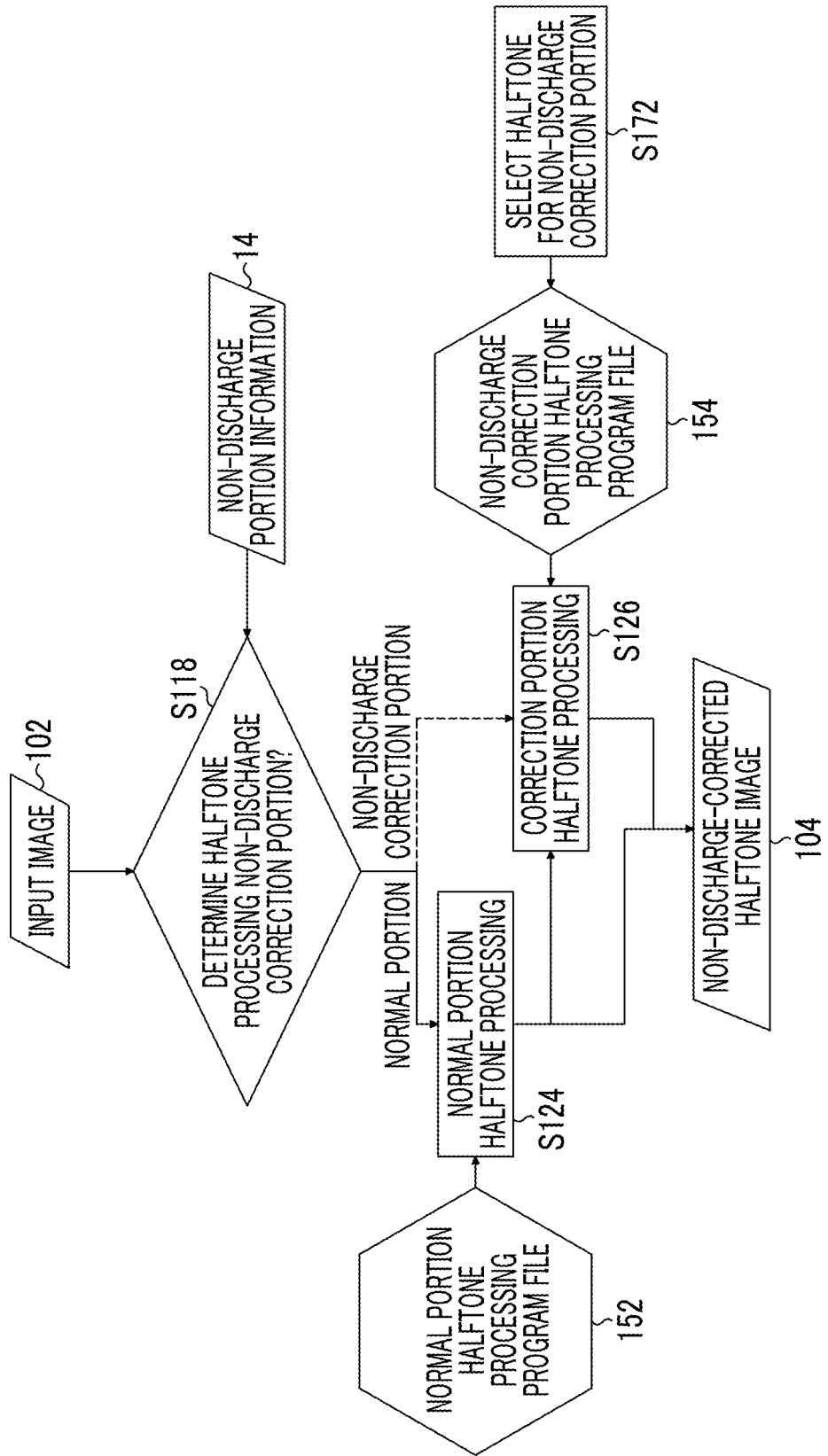
FIG. 19 is a flowchart illustrating an image processing method used in the fourth embodiment and the fifth embodiment.

FIG. 19 is a flowchart illustrating an image processing method used in the fourth embodiment and the fifth embodiment. In the flowchart illustrated in FIG. 19, the same or similar components as those in the flowchart of FIG. 11 are denoted by the same reference numerals and the description thereof will not be repeated.

In the image processing method illustrated in FIG. 19, data which is created by normal portion halftone processing (Step S124) is given as an input to correction portion halftone processing (Step S126). The data input to the correction portion halftone processing (Step S126) may be the normal portion halftone image 164 (see FIG. 16 and FIG. 17) or the cumulative error 510 (see FIG. 18).

Data of the input image 102 may be added as another data which is input to the correction portion halftone processing (Step S126). In FIG. 19, a dashed arrow indicates that the data of the input image 102 is given to the correction portion halftone processing (Step S126).

In the correction portion halftone processing (Step S126), the data of the input image 102 may also be used for halftone processing. In the correction portion halftone processing (Step S126), as an example in which the data of the input image 102 is used, in a case in which the signal value of a pixel to be processed in a portion which is to be subjected to non-discharge correction in the input image 102 is a specific value, a process which does not arrange dots or certainly arranges dots may be performed. Alternatively, in a case in which the signal value of the pixel to be processed is a value other than the specific value, a process which certainly arranges a dot may be performed.

Specifically, for example, the following is considered: in a case in which the value of a pixel corresponding to the non-discharge correction portion in the input image 102 is "0", a process which does not generate a dot at the position of the pixel in the non-discharge correction portion is performed. In this case, a value of "0" corresponds to a "specific value".

For example, the following is considered: in a case in which the value of the pixel corresponding to the non-discharge correction portion in the input image 102 represented by 8-bit gradation is "255", a process which certain arranges a dot at the position of the pixel in the non-discharge correction portion is performed. In this case, a value of "255" corresponds to a "specific value".

As such, it is possible to determine the dot pattern of the non-discharge correction portion with reference to the data of the input image 102, using the correction portion halftone processing (Step S126).

As another example of the process related to the correction portion halftone processing (Step S126), an optimization process may be performed which evaluates the similarity between the input image 102 and the dot pattern of the non-discharge correction portion and re-arranges the dot pattern of the non-discharge correction portion such that the similarity is greater than a predetermined reference value.

For example, the simple sum of difference, the sum of squared difference (SSD) or normalized cross-correlation (NCC) can be used as a similarity evaluation value. When the similarity is evaluated, the similarity may be defined by the actual space of an image or a Wiener spectrum.

Sixth Embodiment

Figure 20:
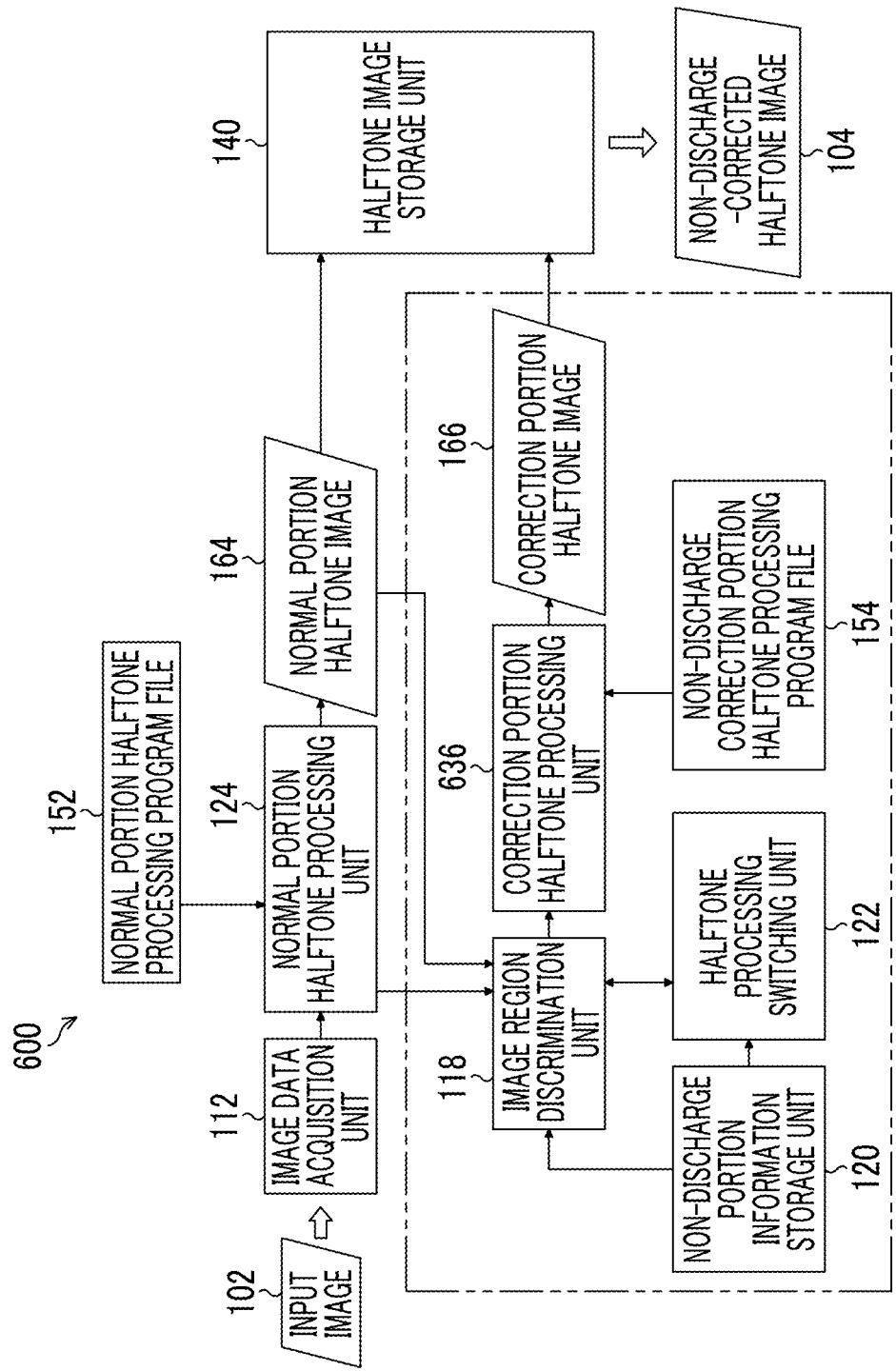
FIG. 20 is a block diagram illustrating the structure of an image processing device according to a sixth embodiment.

FIG. 20 is a block diagram illustrating the structure of an image processing device 600 according to a sixth embodiment. In FIG. 20, the same or similar components as those in FIG. 8 are denoted by the same reference numerals and the description thereof will not be repeated. The sixth embodiment is a modification example of the fourth embodiment (FIG. 16). An image processing method performed by the image processing device 600 according to the sixth embodiment is classified as the second method.

In the image processing device 600 illustrated in FIG. 20, a normal portion halftone processing unit 124 performs halftone processing for an input image 102 to obtain a normal portion halftone image 164 as a halftone image before correction. The normal portion halftone image 164 is a halftone image including a normal portion and a correction portion.

An image region discrimination unit 118 discriminates an image region corresponding to a non-discharge correction portion in the obtained normal portion halftone image 164 and inputs the image data of the non-discharge correction portion in the normal portion halftone image 164 to a correction portion halftone processing unit 636.

The correction portion halftone processing unit 636 changes the arrangement of dots in the non-discharge correction portion and generates a correction portion halftone image 166. The correction portion halftone processing unit 636 functions as a non-discharge correction processing unit. That is, a range which is surrounded by a two-dot chain line in FIG. 20 functions as a "non-discharge correction processing unit" and also functions as a "second halftone processing unit".

<Example of Structure of Inkjet Printing System>

Figure 21:
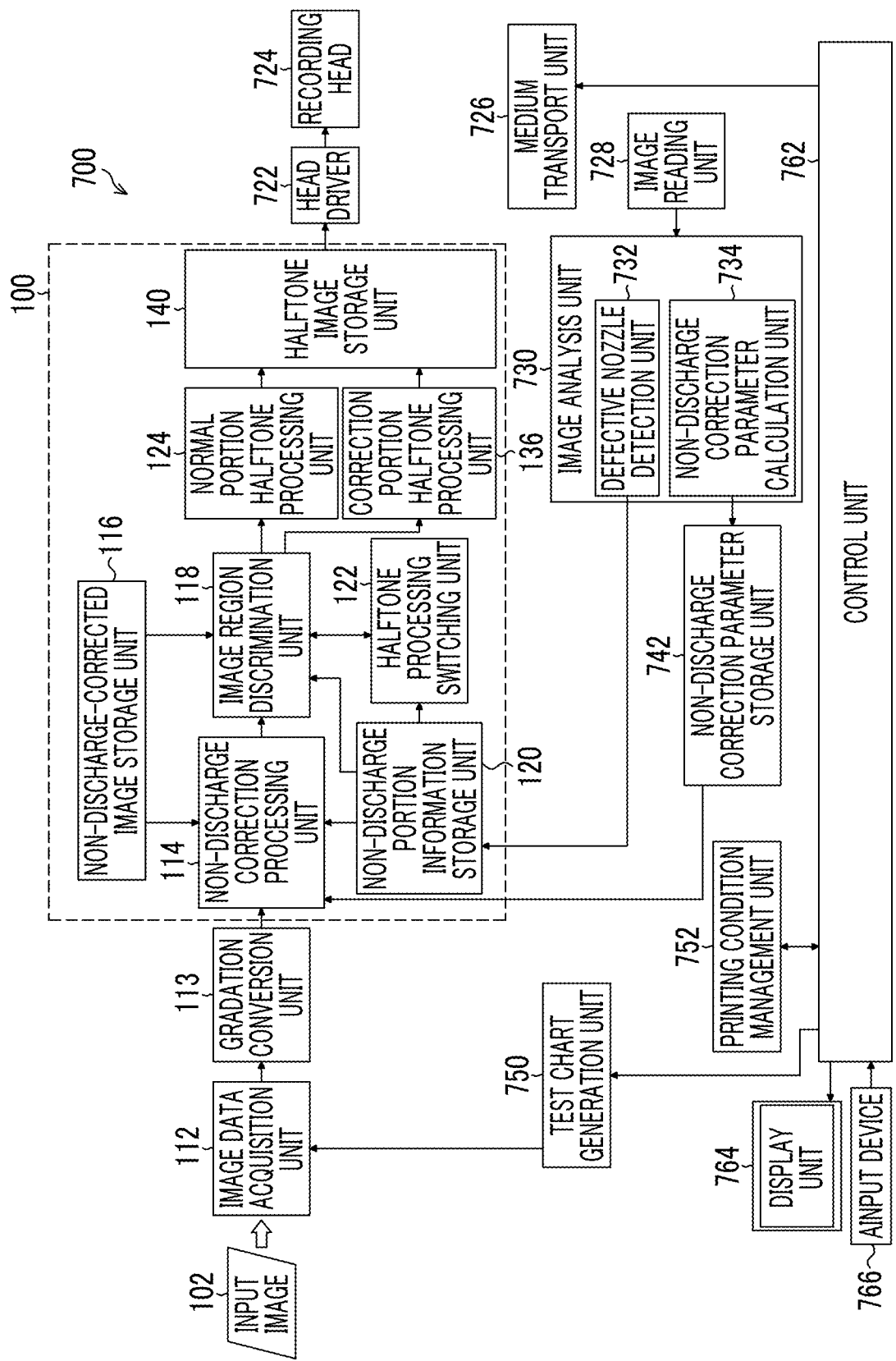
FIG. 21 is a block diagram illustrating an example of the structure of an inkjet printing system.

FIG. 21 is a block diagram illustrating an example of the structure of an inkjet printing system 700. Here, the structure of the image processing device 100 according to the first embodiment described in FIG. 8 is given as an example. However, the structure may be combined with the structure of each of the image processing devices according to other embodiments (second to sixth embodiments).

In FIG. 21, the same or similar components as those described in FIG. 8 are denoted by the same reference numerals and the description thereof will not be repeated.

The inkjet printing system 700 illustrated in FIG. 21 performs image recording using a single pass method and comprises an image processing device 100, a head driver 722, and a recording head 724. The recording head 724 is an inkjet head and corresponds to reference numeral 40 in FIG. 7. In addition, the inkjet printing system 700 comprises a medium transport unit 726 that transports a recording medium (not illustrated in FIG. 21), an image reading unit 728 that reads an image recorded on the recording medium by the recording head 724, and an image analysis unit 730 that analyzes the image read by the image reading unit 728. The image analysis unit 730 includes a defective nozzle detection unit 732 and a non-discharge correction parameter calculation unit 734.

The defective nozzle detection unit 732 performs a process which detects the position of a non-discharge nozzle on the basis of a read image of a defective nozzle detection test chart. In addition, the defective nozzle detection unit 732 calculates an error in the landing position of each nozzle on the basis of the read image of the defective nozzle detection test chart and designates the nozzle in which the landing position error is greater than an allowable value as a non-discharge processed nozzle which is forced not to discharge ink. The non-discharge nozzle and the non-discharge processed nozzle which are detected by the defective nozzle detection unit 732 are treated as non-discharge nozzles. Information about the position of the non-discharge nozzle (that is, non-discharge portion information) is stored in a non-discharge portion information storage unit 120.

The non-discharge correction parameter calculation unit 734 performs an arithmetic process which determines an image gradation correction value (non-discharge correction parameter) of a nozzle adjacent to the position of the non-discharge nozzle from a read image of a non-discharge correction parameter acquisition test chart. The non-discharge correction parameter calculation unit 734 generates a non-discharge correction LUT (corresponding to a non-discharge correction parameter) in which a non-discharge correction value (non-discharge correction gradation) of each nozzle is defined. The non-discharge correction parameter generated by the non-discharge correction parameter calculation unit 734 is stored in a non-discharge correction parameter storage unit 742.

In addition, the inkjet printing system 700 comprises a test chart generation unit 750 that generates data of various test charts including the defective nozzle detection test chart, a printing condition management unit 752 that manages printing conditions required to execute a print job, and a control unit 762 that controls the overall operation of the system. A display unit 764 and an input device 766 are connected to the control unit 762.

The display unit 764 and the input device 766 function as a user interface (UI). Various means, such as a keyboard, a mouse, a touch panel, and a trackball, can be used as the input device 766 and a combination thereof may be used as the input device 766. In addition, the display unit 764 and the input device 766 may be integrally provided as in a structure in which a touch panel is provided on a screen of the display unit 764.

The user can use the input device 766 to input various kinds of information, such as printing conditions and supplementary information, to select an image quality mode, to input and edit supplementary information, and to search for information, and can operate the inkjet printing system 700, while viewing content displayed on the screen of the display unit 764. In addition, the user can check, for example, the content of input information, various kinds of information, or the state of the system from the screen displayed on the display unit 764. The display unit 764 and the input device 766 function as the halftone selection operation unit 172 described in FIG. 9.

The image analysis unit 730, the non-discharge correction parameter storage unit 742, the test chart generation unit 750, the printing condition management unit 752, the control unit 762, the display unit 764, and the input device 766 illustrated in FIG. 21 can be implemented by a combination of hardware and software in a computer which is used as a control device of the inkjet printing system 700.

The image data acquisition unit 112, a gradation conversion unit 113, the non-discharge correction processing unit 114, the non-discharge-corrected image storage unit 116, the image region discrimination unit 118, the non-discharge portion information storage unit 120, the halftone processing switching unit 122, the normal portion halftone processing unit 124, the correction portion halftone processing unit 136, and the halftone image storage unit 140 of the image processing device 100 and the head driver 722 may be provided as an image processing function of an inkjet recording apparatus (printer) or some or all of the components of the image processing device 100 may be provided in the control device.

The head driver 722, the image analysis unit 730, the non-discharge correction parameter storage unit 742, the test chart generation unit 750, the printing condition management unit 752, the control unit 762 may be provided in the image processing device 100.

<<For Inkjet Head>>

The recording head 724 is a line head which has a nozzle row including a plurality of nozzles which are arranged over a length corresponding to the overall width (the maximum width of an image forming region) of a drawing region in a width direction of a recording medium that is perpendicular to a transport direction of the recording medium. The transport direction of the medium by the medium transport unit 726 is a sub-scanning direction (y direction) and the width direction of the medium perpendicular to the transport direction of the medium is a main scanning direction (x direction).

In FIG. 21, for simplicity of description, only one block is illustrated as the recording head 724. However, a system which forms a color image comprises a plurality of recording heads corresponding to a plurality of ink colors. In this example, four color inks, that is, C, M, K, and Y inks are used and recording heads for discharging each color ink are provided for each color. However, the number of ink colors and combinations thereof are not limited to this example. For example, light color inks, such as light cyan (LC) ink and light magenta (LM) ink, may be provided in addition to four color inks, that is, C, M, Y, and K inks or special color inks, such as red and green inks, may be used.

The detailed structure of the recording head 724 is not illustrated. However, the inkjet recording head 724 comprises discharge energy generation elements (for example, piezoelectric elements or heating elements) which generate discharge energy required to discharge ink and are provided so as to correspond to each nozzle. The recording head 724 discharges ink droplets on demand, in response to a driving signal and a discharge control signal from the head driver 722.

<<For Gradation Conversion Unit>>

The gradation conversion unit 113 converts image data such that color characteristics defined by the inkjet printing system 700 are obtained. For example, the gradation conversion unit 113 converts an input CMYK signal (a CMYK signal before density conversion) into a density-converted CMYK signal according to a gradation conversion LUT designated by the printing condition management unit 752. Alternatively, the gradation conversion unit 113 may convert an input CMYK signal (a CMYK signal before density conversion) into a density-converted C signal, a density-converted M signal, a density-converted Y signal, and a density-converted K signal. In the specification, the "LUT" indicates a lookup table.

The gradation conversion LUT is a table in which the relationship (conversion relationship) between an input signal value and an output signal value is described. The gradation conversion LUT is defined for each type of recording medium used in the printer. A plurality of gradation conversion LUTs are prepared according to the type of sheet and an optimum LUT is referred to according to the type of sheet used. The gradation conversion LUT is prepared for each color of ink. In this example, gradation conversion LUTs are provided for each of C, M, Y, and K.

The gradation conversion unit 113 performs a gradation conversion process for the input image 102 acquired by the image data acquisition unit 112 such that a desired gradation is obtained.

The gradation conversion unit 113 has a density unevenness correction function which corrects image data according to recording characteristics depending on the position (x-direction position) of each nozzle in the recording head 724. That is, the gradation conversion unit 113 performs an image signal correction process for suppressing unevenness in the density of a printed image on the recording medium which is caused by, for example, a variation in the discharge characteristics of the nozzle in the recording head 724. In this embodiment, a density unevenness correction LUT, which is a one-dimensional lookup table for correcting density unevenness and in which the conversion relationship between an input signal value and an output signal value is described, is prepared for each nozzle of the recording head 724 and a signal value is converted using the density unevenness correction LUT.

<<For Non-Discharge Correction Processing Unit>>

The non-discharge correction processing unit 114 performs a correction process which corrects image data, using the non-discharge portion information stored in the non-discharge portion information storage unit 120 and the non-discharge correction parameter stored in the non-discharge correction parameter storage unit 742.

In addition, a gradation conversion unit or a non-discharge correction processing unit which integrally performs the gradation conversion process of the gradation conversion unit 113 and the correction process of the non-discharge correction processing unit 114 may be provided.

The content of the process of the image processing device 100 has been described above.

The data of the non-discharge-corrected halftone image generated by the image processing device 100 is converted according to the arrangement of the nozzles and the converted data is output to the head driver 722. A driving signal (marking signal) is supplied to the recording head 724 through the head driver 722 to control the ink discharge operation of the recording head 724.

<<For Medium Transport Unit>>

The transport of the recording medium by the medium transport unit 726 and the discharge of ink from the recording head 724 are controlled to form an image on the recording medium. The medium transport unit 726 is means for transporting the recording medium. Here, the recording medium is transported at a constant speed in the sub-scanning direction (y direction) perpendicular to the longitudinal direction (x direction) of the recording head 724. The medium transport unit 726 can be various types, such as a drum transport type, a belt transport type, and a nip transport type. The detailed structure of the medium transport unit 726 is not illustrated. The medium transport unit 726 includes, for example, a supply roller, a transport motor, and a motor driving circuit. In addition, the medium transport unit 726 is provided with a sensor (for example, an encoder) which detects the position of the recording medium for synchronization with the recording time of the recording head 724 on the recording medium. The medium transport unit 726 transports the recording medium in a fixed direction to move the recording medium relative to the recording head 724. The medium transport unit 726 corresponds to relative moving means for moving the recording medium relative to the recording head 724.

<<For Image Reading Unit>>

The image reading unit 728 reads the image which is recorded on the recording medium by the recording head 724 and converts the image into electronic image data (read image data). For example, a charge coupled device (CCD) line sensor can be used as the image reading unit 728. In this example, the image reading unit 728 is an in-line sensor which is provided on a medium transport path and reads the image recorded by the recording head 724 while the recording medium is transported before it is discharged. The image reading unit 728 can read the output results of a density measuring test chart, which will be described below, and other test charts. In addition, the image reading unit 728 can read a printed image that is recorded on the basis of image data to be printed which is designated by a print job.

The recording head 724, the medium transport unit 726, and the image reading unit 728 are components forming an "inkjet printing machine".

<<For Test Chart Generation Unit>>

The test chart generation unit 750 has a function of generating data of a defective nozzle detecting test chart for detecting a defective nozzle or a non-discharge correction parameter acquiring test chart for calculating a non-discharge correction parameter. In addition, the test chart generation unit 750 generates data of various types of test charts, such as data of a density measuring test chart for obtaining density measurement data required to calculate a density unevenness correction parameter. The test chart generation unit 750 supplies the data of the test chart to the image data acquisition unit 112 in response to an instruction from the control unit 762.

For example, a so-called "1-on-n-off" test chart can be used as the defective nozzle detecting test chart. For the "1-on-n-off" test chart, in a case in which nozzle numbers are sequentially given to nozzles forming a nozzle row which is arranged substantially in the x direction from the end of one line head in the main scanning direction, the nozzles are classified into nozzle groups which discharge ink at the same time by a residual number "B" (B=0, 1, . . . , A−1) obtained by dividing a nozzle number by an integer "A" that is equal to or greater than 2 and the droplet discharge time of each group of nozzles with nozzle numbers AN+0, AN+1, . . . , AN+B (where N is an integer that is equal to or greater than 0) is changed. Then, ink droplets are continuously discharged from each nozzle to form a line group.

When the defective nozzle detecting test chart is used, line patterns between adjacent nozzles do not overlap each other and independent line patterns (different line patterns) are formed for each nozzle.

It is possible to check whether ink is discharged from each nozzle (natural non-discharge) from the output result of the defective nozzle detecting test chart. In addition, the landing position of ink from each nozzle is measured. When an error in the landing position of ink from a nozzle is greater than an allowable value, the nozzle can be determined to be a bent nozzle.

The time when the non-discharge portion information is updated is not particularly limited. For example, the non-discharge portion information is updated before a print job starts or whenever a predetermined number of copies are printed during a print job. In this embodiment, the defective nozzle detecting test chart is recorded on a blank portion of each recording medium during printing and the image reading unit 728 reads the defective nozzle detecting test chart. In this way, a defective nozzle is detected in an early stage and a non-discharge correction process using a non-discharge process is applied.

The non-discharge correction parameter acquiring test chart includes a density pattern patch in which non-discharge correction parameters (correction coefficients) are applied to the positions of nozzles adjacent to both sides of a nozzle that is simulated as a non-discharge nozzle (a nozzle that is intended not to discharge ink). It is possible to specify an optimum non-discharge correction parameter from the drawing results having different non-discharge correction parameters. A patch in which the position of the nozzle that is simulated as the non-discharge is changed is created to determine the optimum correction value (correction coefficient) for each nozzle.

<<Printing Condition Management Unit>>

The printing condition management unit 752 manages print job information in which image data to be printed is associated with information about printing conditions. When image data to be printed is input or after the image data is input, the user can input the setting information of the printing conditions. The printing condition management unit 752 generates print job information in which the setting information of the printing conditions is associated with the image data to be printed and performs the storage and management of the information in the unit of print jobs. For example, an output image data name, a recording medium type name (sheet type), a medium size, and various kinds of parameter information used for image processing are associated with each print job and are stored.

When a print job to be printed is selected, the printing condition management unit 752 sets various parameters of data designated by the selected print job in a corresponding processing unit.

<<For Recording Medium>>

Examples of the "recording medium" include media which are referred to by various terms, such as a printing medium, a medium on which data is recorded, a medium on which an image is formed, an image receiving medium, a medium onto which ink is discharged. In the invention, for example, the material and shape of the recording medium are not particularly limited. Various types of sheet-shaped bodies can be used regardless of a material and a shape. For example, continuous paper, a cut sheet, a seal sheet, a resin sheet, such as an overhead projector (OHP) sheet, a film, cloth, non-woven cloth, a printed-circuit board on which a wiring pattern is formed, and a rubber sheet can be used.

<Description of Operation of Inkjet Printing System 700>

Figure 22:
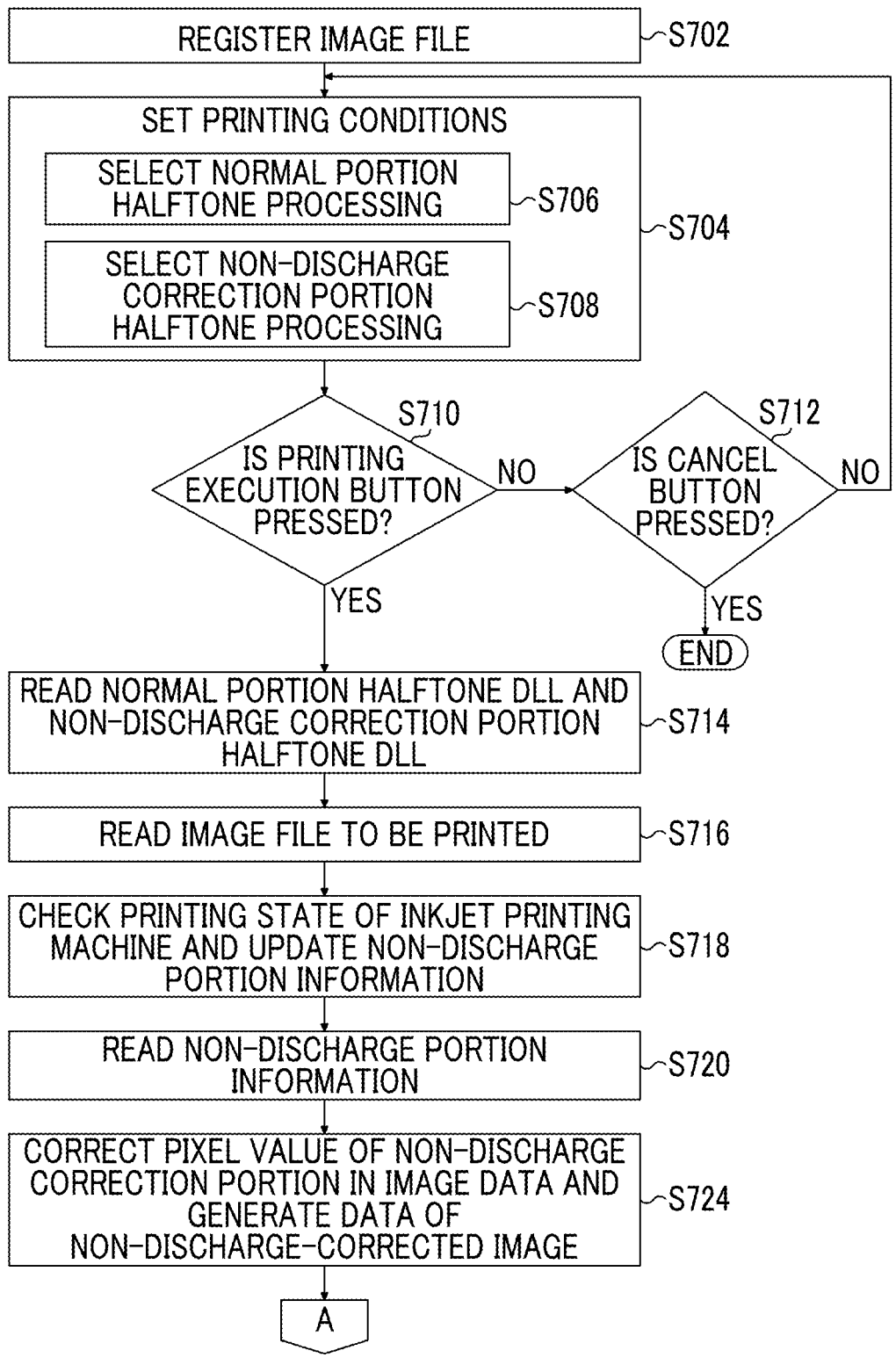
FIG. 22 is a flowchart illustrating the procedure of an operation when printing is performed by the inkjet printing system according to this example.
Figure 23:
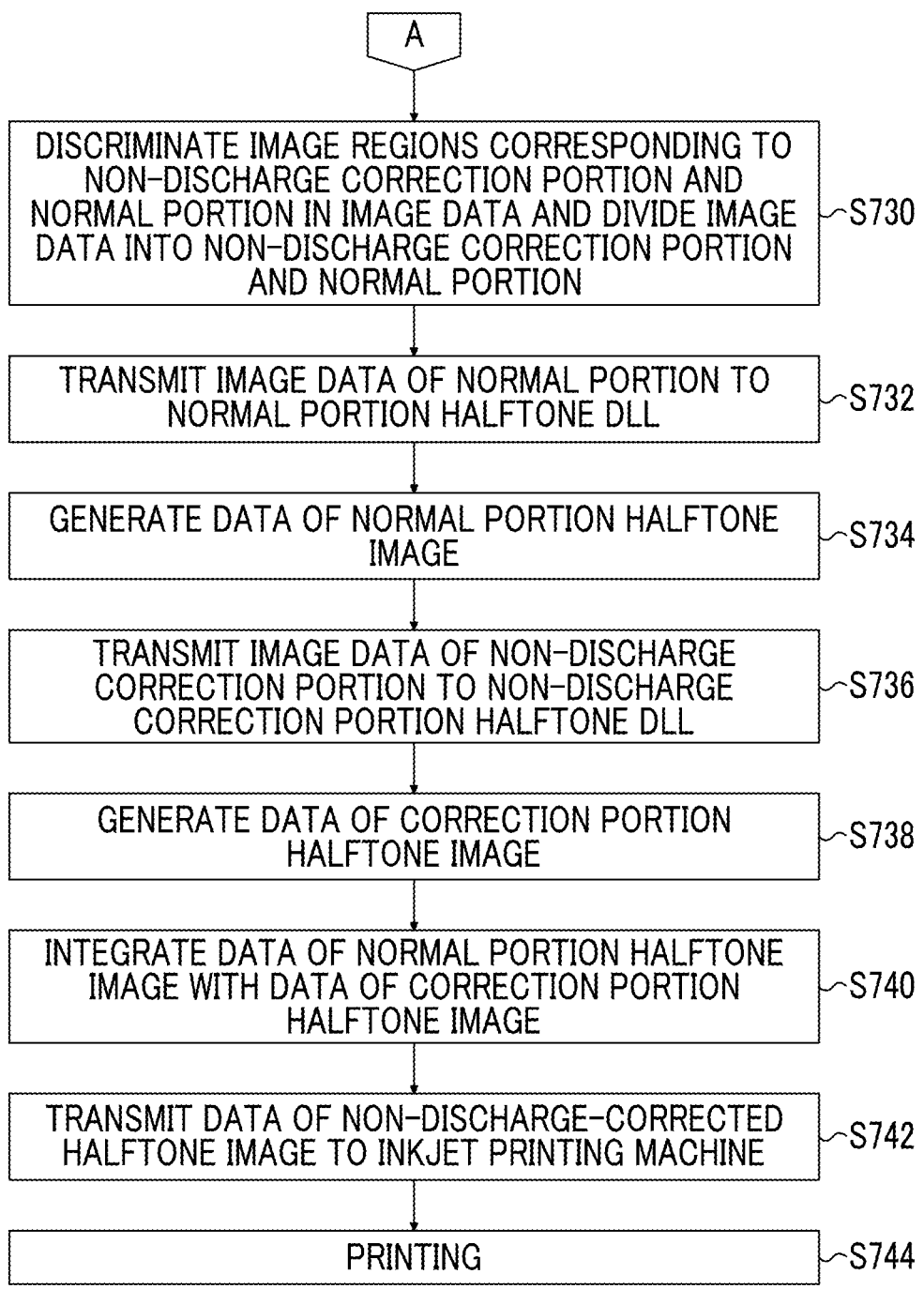
FIG. 23 is a flowchart illustrating the procedure of an operation when printing is performed by the inkjet printing system according to this example.

FIGS. 22 and 23 are flowcharts illustrating the procedure of a printing operation of the inkjet printing system 700 in this example.

First, the user who is a printing operator registers an image file of image data to be printed in the system (Step S702). Then, the user sets printing conditions (Step S704). The setting of the printing conditions includes the selection of halftone processing applied to the normal portion (Step S706) and the selection of halftone processing applied to the non-discharge correction portion (Step S708). In addition to the above, the setting of the printing conditions includes, for example, the designation of the number of copies and the designation of a sheet type.

In the inkjet printing system 700 according to this example, a plurality of DLL files of different types of halftone processing for a non-discharge correction portion are prepared in a halftone DLL folder (not illustrated in FIG. 21) for a non-discharge correction portion in the image processing device 100.

In addition, at least one halftone processing DLL file for a normal portion, preferably, a plurality of halftone processing DLL files for a normal portion are prepared in a halftone DLL folder (not illustrated in FIG. 21) for a normal portion in the image processing device 100.

The user who is a printing operator can select a desired type of halftone processing for a non-discharge correction portion from the plurality of types of halftone processing for a non-discharge correction portion which are prepared in advance. In addition, the user can select a desired type of halftone processing for a normal portion from the plurality of types of halftone processing for a normal portion which are prepared in advance.

The operation of selecting the halftone processing is performed through a user interface of the inkjet printing system 700.

Figure 24:
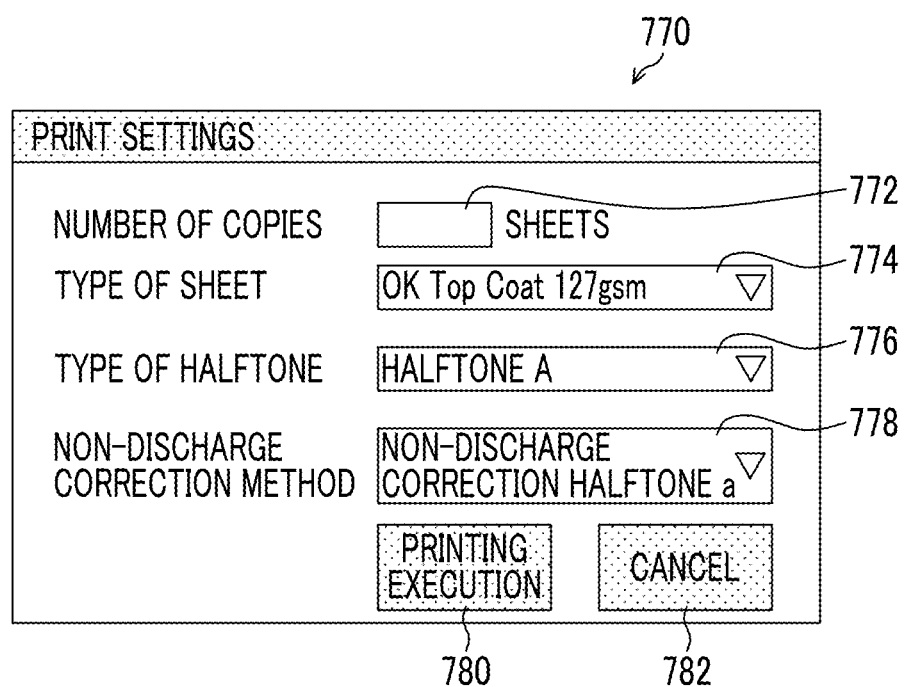
FIG. 24 is a diagram illustrating an example of a print setting screen for setting printing conditions.

FIG. 24 illustrates an example of a graphical user interface (GUI) screen for setting printing conditions. A print setting screen 770 is provided with a number-of-copies designation portion 772 for designating the number of copies, a sheet type designation portion 774 for designating a sheet type, a halftone type designation portion 776 for designating the type of halftone processing to be applied to a normal portion, a non-discharge correction type designation portion 778 for designating the type of halftone processing to be applied to a non-discharge correction portion, a printing execution button 780, and a cancel button 782.

Each of the fields of the sheet type designation portion 774, the halftone type designation portion 776, the non-discharge correction type designation portion 778 is a drop-box UI in which a list of candidates that can be selected in a drop-down menu manner is displayed.

The user selects the types of halftone processing to be applied to the non-discharge correction portion and the normal portion, designates necessary conditions, such as the number of copies or a sheet type, and registers a print job.

The printing execution button 780 is a GUI button that is used to confirm and to input an instruction to perform printing. The cancel button 782 is a GUI button that is used to input an instruction to cancel the setting of the printing conditions.

When the user inputs a necessary setting item through the print setting screen 770 illustrated in FIG. 24 and presses the printing execution button 780, printing is performed.

Means for selecting the type of halftone processing can be optionally provided as an additional function. Therefore, the means for the selection operation can be omitted.

For example, in a case in which only one halftone processing program file for a non-discharge correction portion is prepared in the system, such as case in which only one type of halftone processing for a non-discharge correction portion and only one type of halftone processing for a normal portion are prepared in advance, an operation of selecting the type of halftone processing for a non-discharge correction portion can be omitted.

Returning to the flowchart illustrated in FIG. 22, it is determined in Step S710 of FIG. 22 whether the printing execution button 780 has been pressed. When the printing execution button 780 has not been pressed, that is, the determination result is Step S710 is "NO", the process proceeds to Step S712 and it is determined whether the cancel button 782 has been pressed. In a case in which the cancel button 782 has pressed, the setting of the printing conditions is cancelled and the process ends.

On the other hand, when it is determined in Step S712 that the cancel button 782 has not been pressed, the process returns to Step S704 and an instruction to change the settings is received.

When the printing execution button 780 is pressed and the determination result in Step S710 is "YES", the process proceeds to Step S714. In Step S714, the selected halftone DLL for non-discharge correction portion and the selected halftone DLL for a normal portion are read according to the printing conditions set by the user. The read halftone DLL for a non-discharge correction portion corresponds to the "halftone processing program file 154 for a non-discharge correction portion" described in FIG. 8 and the halftone DLL for a normal portion corresponds to the "halftone processing program file 152 for a normal portion".

Then, the image processing device 100 reads an image file which is registered as a printing target (Step S716).

The inkjet printing system 700 checks the printing state of an inkjet printing machine which is a drawing unit and updates the non-discharge portion information (Step S718). Specifically, the inkjet printing system 700 outputs a test chart, analyzes a read image which is the output result of the test chart, and obtains non-discharge portion information.

Then, the image processing device 100 reads new non-discharge portion information updated in Step S718 (Step S720). Then a non-discharge correction process is performed which corrects the pixel value of the non-discharge correction portion in the image data, using the non-discharge portion information, and generates data of the non-discharge correction portion image (Step S724).

Then, the process proceeds to Step S730 in FIG. 23. In Step S730, a process is performed which discriminates between image regions corresponding to the non-discharge correction portion and the normal portion in the image data using the non-discharge portion information and divides the image data into the non-discharge correction portion and the normal portion.

Then, the image data of the normal portion is transmitted to the halftone DLL for a normal portion (Step S732) and the halftone DLL for a normal portion is executed to generate data of the normal portion halftone image (Step S734). The data of the normal portion halftone image may be output to a file or a region with a specific address in the memory. In addition, the data of the normal portion halftone image, intermediate data generated by normal portion halftone processing may be output, if necessary.

The image data of the non-discharge correction portion divided in Step S730 is transmitted to the halftone DLL for a non-discharge correction portion (Step S736) and the halftone DLL for a non-discharge correction portion is executed to data of the correction portion halftone image (Step S738). The data of the correction portion halftone image may be a file or a region with a specific address in the memory. In this case, the intermediate data described in Step S734 may be transmitted together with the data of the correction portion halftone image.

The process for the normal portion (Steps S732 to S734) and the process for the non-discharge correction portion (Steps S736 to S738) may be performed in a reverse order or may be performed in parallel.

The data of the normal portion halftone image generated in Step S734 and the data of the correction portion halftone image generated in Step S738 are integrated (Step S740) and data of a non-discharge-corrected halftone image is obtained.

The integrated data of the non-discharge-corrected halftone image is transmitted to the inkjet printing machine (Step S742) and the discharge of ink from each nozzle is controlled to perform printing (Step S744).

In a case in which printing is performed on a plurality of sheets, the process from Step S732 to Step S734 is performed and then the process from Step S718 to Step S730 and the process from Step S736 to Step S744 are repeated after a predetermined period of time has elapsed.

For the non-discharge correction function, in the case of an inkjet printing system using an image processing device that adopts the non-discharge correction method classified as the second method, the non-discharge correction process described in Step S724 of FIG. 22 is omitted and the non-discharge correction process is substantially performed by the halftone processing for a non-discharge correction portion (Steps S736 to S738).

<Execution Time and Frequency of Halftone Processing and the Number of Times Halftone Processing is Performed>

In the inkjet printing system 700 according to this embodiment, the halftone processing for a normal portion and the halftone processing for a non-discharge correction portion are not necessarily performed at the same time. The halftone processing for a normal portion and the halftone processing for a non-discharge correction portion may be performed at different times.

For example, for the halftone processing for a non-discharge correction portion, in a case in which it is confirmed that new non-discharge portion has been generated by the update of the non-discharge portion information, the halftone processing may be partially performed in the range of the correction portion including the non-discharge portion and the non-discharge correction portion. The halftone processing may not be performed for the other part of the normal portion and the non-discharge-corrected halftone image may be generated using the data of the original normal portion halftone image.

As such, when a non-discharge portion is generated, the halftone processing for a non-discharge correction portion is partially performed and the data of the non-discharge correction portion is combined with the data of the normal portion halftone image. Therefore, it is possible to significantly reduce the time required for halftone processing and to prevent a reduction in productivity.

In the case of the above-mentioned structure, the frequency of the halftone processing for a non-discharge correction portion is higher than the frequency of the halftone processing for a normal portion. In addition, the total number of times the halftone processing for a non-discharge correction portion is performed is larger than the total number of times the halftone processing for a normal portion is performed.

Figure 25:
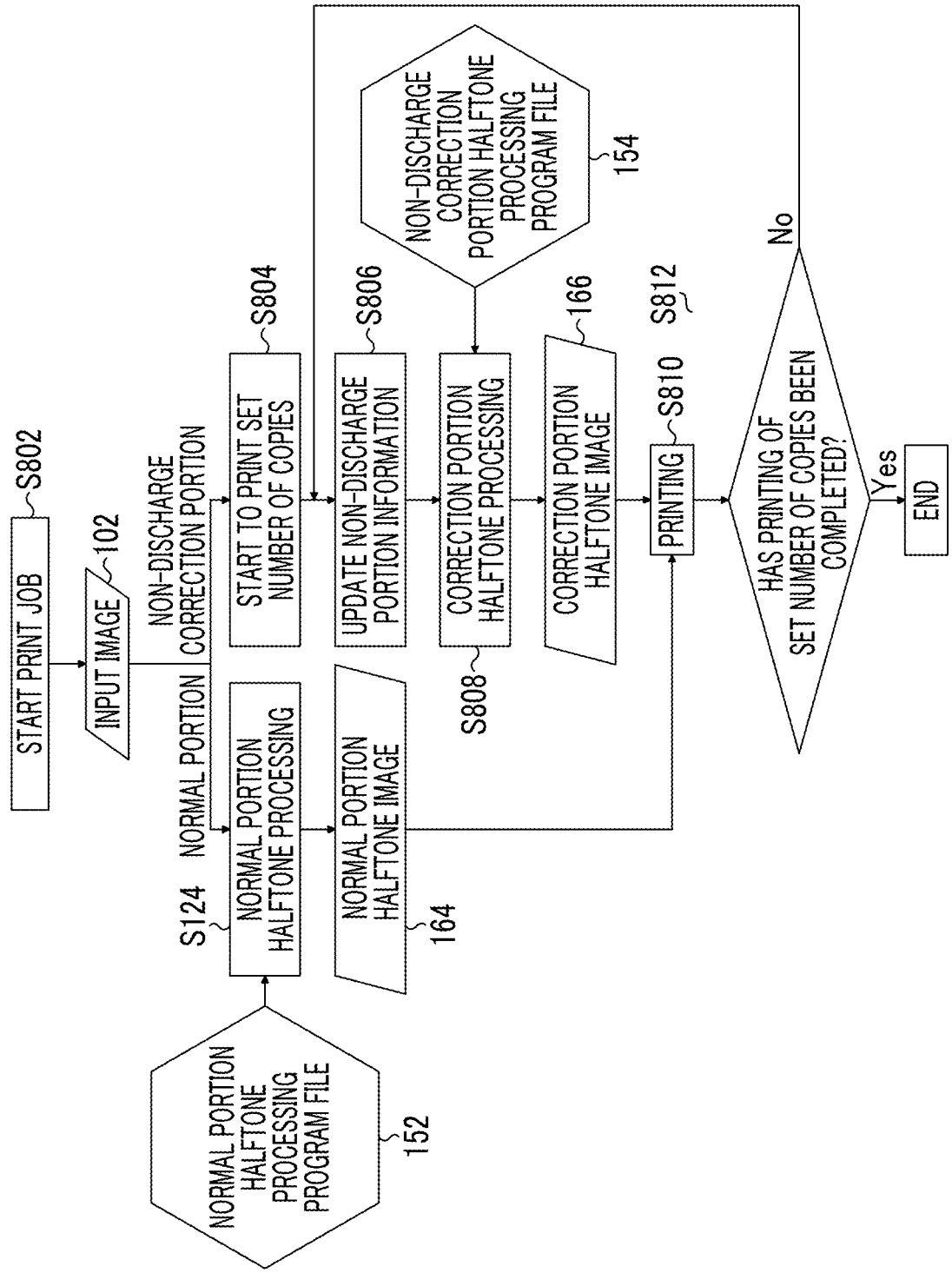
FIG. 25 is a flowchart illustrating an example in which halftone processing for a normal portion and halftone processing for a non-discharge correction portion are performed at different times.

FIG. 25 is a flowchart illustrating an example of a structure in which the halftone processing for a normal portion and the halftone processing for a non-discharge correction portion are performed at different times. The flowchart illustrated in FIG. 25 can be applied to the image processing devices according to the first to sixth embodiments. In FIG. 25, the same or similar components as those in the flowchart illustrated in FIG. 11 are denoted by the same reference numerals and the description thereof will not be repeated.

As illustrated in FIG. 25, when a print job starts (Step S802), image regions corresponding to a normal portion and a non-discharge correction portion are discriminated in an input image 102 to be printed and normal portion halftone processing (Step S124) is performed for the image data of the normal portion. Data of a normal portion halftone image 164 generated by the normal portion halftone processing is stored in, for example, the halftone image storage unit 140 (see FIG. 8).

When an instruction to start the printing of a set number of copies is issued (Step S804), the non-discharge portion information based on a process of outputting and reading a test pattern is updated (Step S806). Then, correction portion halftone processing (Step S808) is performed for the image data of the non-discharge correction portion on the basis of the non-discharge portion information and a correction portion halftone image 166 is generated. Then, printing is performed on the basis of a non-discharge-corrected halftone image generated by a combination of the data of the normal portion halftone image 164 and the data of the correction portion halftone image 166 (Step S810).

The number of copies is counted and it is determined whether the printing of a predetermined number of copies has been completed (Step S812). When the printing of a predetermined number of copies has not been completed, the process returns to Step S806. The non-discharge portion information may be updated whenever one copy is printed or at the time when a predetermined number of copies are printed. When the non-discharge portion information is updated in Step S806, halftone processing is partially performed for the non-discharge correction portion in Step S808 and a new non-discharge-corrected halftone image is generated.

When the printing of a set number of copies has been completed, that is, the determination result in Step S812 is "YES", the process is completed.

As described in FIG. 25, the data of the normal portion halftone image 164 is created in advance and the data of the correction portion halftone image 166 of the correction portion is sequentially created on the basis of the non-discharge portion information which is appropriately updated during the printing of a print job.

According to this structure, it is not necessary to perform halftone processing for the entire image when non-discharge correction is performed. Therefore, it is possible to reduce the time required for halftone processing when a streak is generated due to a non-discharge nozzle during continuous printing.

<Program Causing Computer to Function as Image Processing Device>

A program that causes a computer to function as an image processing device which performs halftone processing or a non-discharge correction process for implementing the non-discharge correction function according to the above-described embodiment can be recorded on a compact disc-read only memory (CD-ROM), a magnetic disk, or other computer-readable media (non-transitory organic information storage media) and can be provided through the information storage medium. Instead of the aspect in which the program is stored in the information storage medium and is then provided, a program signal may be provided as a download service through a communication network such as the Internet.

The program can be incorporated into a computer to cause the computer to implement a function (non-discharge portion information storage function) of storing non-discharge portion information, a function (halftone processing function) of performing halftone processing, and a function (non-discharge correction process function) of performing an image correction process which reduces the visibility of an image defect of a recording defect portion caused by a defective nozzle. In this way, it is possible to perform the non-discharge correction according to the above-described embodiment.

In addition, a portion of or the entire program for implementing printing control including an image processing function of performing halftone processing or a non-discharge correction process for implementing the non-discharge correction function described in this embodiment may be incorporated into a host control device, such as a host computer, or the program may be applied as an operation program of a central processing unit (CPU) of a printer (inkjet recording apparatus) as an image output apparatus.

The non-discharge correction processing function of the non-discharge correction processing unit 114 described in FIG. 8 or the processing function of the correction portion halftone processing units 436 and 536 described in FIGS. 16 to 18 corresponds to a "non-discharge correction processing function". In addition, the halftone processing function of the normal portion halftone processing unit 124 corresponds to an example of a "first halftone processing function" and the halftone processing function of the correction portion halftone processing unit 136 corresponds to an example of a "second halftone processing function".

In the above-described embodiments of the invention, constituent features can be appropriately changed, added, or deleted, without departing from the scope and spirit of the invention. The invention is not limited to the above-described embodiments and various modifications and changes of the invention can be made by those skilled in the art within the technical scope and spirit of the invention.

EXPLANATION OF REFERENCES

12: input image
14: non-discharge portion information
16: non-discharge-corrected image
18: non-discharge-corrected halftone image
40: inkjet head
42: nozzle
46: non-discharge nozzle
47, 48: correction nozzle
100: image processing device
102: input image
104: non-discharge-corrected halftone image
114: non-discharge correction processing unit
118: image region discrimination unit
120: non-discharge portion information storage unit
122: halftone processing switching unit
124: normal portion halftone processing unit
136: correction portion halftone processing unit
140: halftone image storage unit
150: non-discharge correction process program file
152: normal portion halftone processing program file
154: non-discharge correction portion halftone processing program file
164: normal portion halftone image
166: correction portion halftone image
172: halftone selection operation unit
200, 300, 400, 500, 600: image processing device
318: image region division unit
344: image integration unit
700: inkjet printing system

What is claimed is:

1. An image processing device comprising:
a non-discharge correction processing unit that perfbrms an image correction process for correcting an image defect caused by a non-discharge nozzle in an inkjet head including a plurality of nozzles;
a non-discharge portion information storage unit that stores non-discharge portion information corresponding to a position of the non-discharge nozzle;
an image region discrimination unit that discriminates between a normal portion and a non-discharge correction portion in an input image, on the basis of the non-discharge portion information, wherein the normal portion is an image region other than a non-discharge correction portion to be subjected to the image correction process by the non-discharge correction processing unit and a non-discharge portion in which recording is not possible due to the non-discharge nozzle;

a first halftone processing unit configured to perform first halftone processing for the input image by using at least one first halftone processing program file to generate a first halftone image; and a second halftone processing unit configured to perform second halftone processing for the non-discharge correction portion by using at least one second halftone processing program file that is different from the first halftone processing program file to generate a second halftone image, the second halftone processing being different from the first halftone processing, wherein the second halftone processing unit is configured to receive an input of data that is related to the first halftone processing and generated by the first halftone processing unit to reflect a characteristic of the normal portion adjacent to the non-discharge correction portion in the second halftone image based on the data, wherein the second halftone processing unit receives a cumulative error that is generated by an error diffusion process in the first halftone processing as an input to the second halftone processing, and wherein the second halftone processing unit performs an error diffusion process for the non-discharge correction portion by using the cumulative error as initial error data, the device further comprising an arithmetic processing unit, wherein the second halftone processing unit receives the first halftone image created by the first halftone processing as an input to the second halftone processing, wherein the arithmetic processing unit applies a blur function to the first halftone image that is given as the input to the second halftone processing, wherein the second halftone processing unit performs the second halftone processing for data obtained by applying the blur function to the first halftone image, and wherein the second halftone processing unit is configured to reflect a frequency characteristic of the normal portion to the non-discharge correction portion.

2. The mage processing device according to claim 1, further comprising:
a non-discharge portion information storage unit that stores non-discharge portion information corresponding to a position of the non-discharge nozzle;
an image division processing unit that divides the input image into the normal portion and the non-discharge correction portion on the basis of the non-discharge portion information; and
an integration processing unit that integrates the first halftone image obtained by the execution of the first halftone processing program file for the normal portion divided by the image division processing unit with the second halftone image obtained by the execution of the second halftone processing program file for the non-discharge correction portion divided by the image division processing unit.

3. The image processing device according to claim 1, wherein an algorithm of the first halftone processing by the first halftone processing program file is different from an algorithm of the second halftone processing by the second halftone processing program file.

4. The image processing device according to claim 3, wherein the second halftone processing is performed by the second halftone processing program file using a dither mask.

5. The image processing device according to claim 1, wherein the first halftone processing for the normal portion and the second halftone processing for the non-discharge correction portion are performed at different times, the frequency of the second halftone processing for the non-discharge correction portion is higher than the frequency of the first halftone processing for the normal portion, or the number of times the second halftone processing is performed for the non-discharge correction portion is larger than the number of times the first halftone processing is performed for the normal portion.

6. The image processing device according to claim 5, further comprising:
a first halftone image storage unit that stores the first halftone image obtained by the execution of the first halftone processing for the normal portion,
wherein a process which integrates the second halftone image of the non-discharge correction portion that is sequentially created by performing the second halftone processing for the non-discharge correction portion according to a state of the non-discharge nozzle in the inkjet head with the first halftone image that is stored in the first halftone image storage unit in advance is performed.

7. The image processing device according to claim 1, further comprising:
an arithmetic processing unit,
wherein data of the first halftone image of the normal portion created by the first halftone processing is given as an input to the second halftone processing,
the arithmetic processing unit applies a blur function to the first halftone image which is given as the input to the second halftone processing, and
the second halftone processing is performed for data obtained by applying the blur function to the first halftone image.

8. The image processing device according to claim 1, further comprising:
wherein the data which is created by the first halftone processing and is given as the input to the second halftone processing is a cumulative error which is generated by an error diffusion process in the first halftone processing, and
the second halftone processing program file performs the error diffusion process in the non-discharge correction portion, using the cumulative error as initial error data.

9. The image processing device according to claim 1, further comprising:
wherein the second halftone processing program file performs the second halftone processing for the non-discharge correction portion, using the input image in addition to the data created by the first halftone processing.

10. The image processing device according to claim 9, wherein, in the second halftone processing, a process that arranges no dots is performed in a case in which a signal value of a pixel to be processed which corresponds to the non-discharge correction portion of the input image is equal to a specific value or a process that certainly arranges dots is performed in a case in which the signal value of the pixel to be process is equal to or less than the specific value.

11. The image processing device according to claim 1, wherein a plurality of the second halftone processing program files that can be applied to the second halftone processing for the non-discharge correction portion are provided.

12. The image processing device according to claim 11, further comprising:
a user interface that enables a user to select a second halftone processing program file used for the second halftone processing from the plurality of second halftone processing program files.

13. The image processing device according to claim 1,
wherein the inkjet head is a line head used in an inkjet printing system that records an image using a single-pass method, and
the non-discharge correction portion is an image region including pixel rows which are adjacent to both sides of a pixel row of the non-discharge portion.

14. An image processing method comprising:
a non-discharge correction processing step of performing an image correction process for correcting an image defect caused by a non-discharge nozzle in an inkjet head including a plurality of nozzles;
a non-discharge portion information storage step of storing non-discharge portion information corresponding to a position of the non-discharge nozzle;
an image region discrimination step of discriminating between a normal portion and a non-discharge correction portion in an input image, on the basis of the non-discharge portion information, wherein the normal portion is an image region other than a non-discharge correction portion to be subjected to the image correction process by the non-discharge correction processing unit and a non-discharge portion in which recording is not possible due to the non-discharge nozzle;
a first halftone processing step of executing a first halftone processing program file to perform first halftone processing to generate a first halftone image; and
a second halftone processing step of executing a second halftone processing program file that is different from the first halftone processing program file to perform second halftone processing, which is different from the first halftone processing, for the non-discharge correction portion in the input image, to generate a second halftone image, wherein the second halftone processing step includes receiving an input of data that is related to the first halftone processing and generated by the first halftone processing unit to reflect a characteristic of the normal portion adjacent to the non-discharge correction portion in the second halftone image based on the data,
wherein the second halftone processing step receives a cumulative error that is generated by an error diffusion process in the first halftone processing as an input to the second halftone processing, and
wherein the second halftone processing step performs an error diffusion process for the non-discharge correction portion by using the cumulative error as initial error data,
the method further comprising an arithmetic processing step,
wherein the second halftone processing step receives the first halftone image created by the first halftone processing step as an input to the second halftone processing step,
wherein the arithmetic processing step applies a blur function to the first halftone image that is given as the input to the second halftone processing step,
wherein the second halftone processing step performs the second halftone processing for data obtained by applying the blur function to the first halftone image, and
wherein the second halftone processing step reflects a frequency characteristic of the normal portion to the non-discharge correction portion.

15. A non-transitory computer-readable recording medium storing commands that are read by a computer and cause the computer to perform:
a non-discharge correction processing step of performing an image correction process for correcting an image defect caused by a non-discharge nozzle in an inkjet head including a plurality of nozzles;
a non-discharge portion information storage step of storing non-discharge portion information corresponding to a position of the non-discharge nozzle;
an image region discrimination step of discriminating between a normal portion and a non-discharge correction portion in an input image, on the basis of the non-discharge portion information, wherein the normal portion is an image region other than a non-discharge correction portion to be subjected to the image correction process by the non-discharge correction processing unit and a non-discharge portion in which recording is not possible due to the non-discharge nozzle;
a first halftone processing step of executing a first halftone processing program file to perform first halftone processing to generate a first halftone image; and
a second halftone processing step of executing a second halftone processing program file that is different from the first halftone processing program file to perform second halftone processing, which is different from the first halftone processing, for the non-discharge correction portion in the input image, to generate a second halftone image, wherein the second halftone processing step includes receiving an input of data that is related to the first halftone processing and generated by the first halftone processing unit to reflect a characteristic of the normal portion adjacent to the non-discharge correction portion in the second halftone image based on the data,
wherein the second halftone processing step receives a cumulative error that is generated by an error diffusion process in the first halftone processing as an input to the second halftone processing, and
wherein the second halftone processing step performs an error diffusion process for the non-discharge correction portion by using the cumulative error as initial error data,
further comprising an arithmetic processing step,
wherein the second halftone processing step receives the first halftone image created by the first halftone processing step as an input to the second halftone processing step,
wherein the arithmetic processing step applies a blur function to the first halftone image that is given as the input to the second halftone processing step,
wherein the second halftone processing step performs the second halftone processing for data, obtained by applying the blur function to the first halftone image; and
wherein the second halftone processing step reflects a frequency characteristic of the normal portion to the non-discharge correction portion.

16. An inkjet printing system comprising:
the image processing device according to claim 1; and
the inkjet head, wherein the inkjet head records an image on the basis of data of a halftone image generated by the image processing device.

17. The image processing device according to claim 1, wherein the halftone processing for the non-discharge correction portion and the halftone processing for the normal portion comprise different types of processing.

18. The image processing device according to claim 1, wherein
the second halftone processing unit is configured to reflect error that is the characteristic of the normal portion and occurs due to quantization of the normal portion, to the non-discharge correction portion.

19. The image processing device according to claim 1, wherein the second halftone processing unit accumulates diffusion error data for the non-discharge correction portion, which is generated by the error diffusion process for the normal portion, for each pixel, stores the accumulated diffusion error data as the cumulative error, and performs the error diffusion process for the non-discharge correction portion, using the cumulative error as the initial error data, with reference to the stored cumulative error.

* * * * *